(12) United States Patent
Sheffield

(10) Patent No.: US 8,296,494 B1
(45) Date of Patent: Oct. 23, 2012

(54) EXPANDED ELECTRONIC BUS COMMUNICATION CAPACITY

(75) Inventor: Gregory L. Sheffield, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 12/751,219

(22) Filed: Mar. 31, 2010

(51) Int. Cl.
*G06F 13/42* (2006.01)
*G06F 13/12* (2006.01)

(52) U.S. Cl. .................. 710/305; 710/104; 370/489

(58) Field of Classification Search .......... 710/104
See application file for complete search history.

(56) References Cited

U.S. PATENT DOCUMENTS

| | | | | |
|---|---|---|---|---|
| 3,488,445 A * | 1/1970 | Chang Robert W | .......... | 370/203 |
| 5,581,462 A * | 12/1996 | Rogers | .......... | 701/3 |
| 5,889,856 A * | 3/1999 | O'Toole et al. | .......... | 379/399.02 |
| 6,333,920 B1 * | 12/2001 | Nguyen et al. | .......... | 370/281 |
| 6,615,116 B2 * | 9/2003 | Ebert et al. | .......... | 701/3 |
| 6,850,618 B1 * | 2/2005 | Mohajeri et al. | .......... | 379/399.01 |
| 6,959,356 B2 * | 10/2005 | Packwood et al. | .......... | 710/315 |
| 7,333,475 B2 * | 2/2008 | LeBlanc et al. | .......... | 370/352 |
| 7,394,819 B2 * | 7/2008 | Chen et al. | .......... | 370/401 |
| 7,409,056 B2 * | 8/2008 | LeBlanc et al. | .......... | 379/399.01 |
| 7,545,868 B2 * | 6/2009 | Kennedy et al. | .......... | 375/259 |
| 7,742,466 B2 * | 6/2010 | LeBlanc et al. | .......... | 370/352 |
| 7,802,048 B2 * | 9/2010 | Campbell | .......... | 710/315 |
| 8,155,285 B2 * | 4/2012 | LeBlanc et al. | .......... | 379/93.09 |
| 2003/0023795 A1 * | 1/2003 | Packwood et al. | .......... | 710/105 |
| 2004/0199681 A1 * | 10/2004 | Hedtke | .......... | 710/37 |
| 2006/0101184 A1 * | 5/2006 | Hegarty | .......... | 710/307 |
| 2009/0037627 A1 * | 2/2009 | Rofougaran | .......... | 710/105 |
| 2009/0132748 A1 * | 5/2009 | Sheffield | .......... | 710/307 |
| 2010/0070674 A1 * | 3/2010 | Campbell | .......... | 710/315 |
| 2010/0088537 A1 * | 4/2010 | Hua et al. | .......... | 713/600 |
| 2011/0066774 A1 * | 3/2011 | Rofougaran | .......... | 710/105 |

* cited by examiner

*Primary Examiner* — Ryan Stiglic

(74) *Attorney, Agent, or Firm* — Yee & Associates, P.C.

(57) ABSTRACT

In an embodiment, an apparatus comprises a bus network having a set of lines, and a number of communication system devices associated with a number of electronics equipment connected to the bus in which each communication system device configures the electronics equipment to send and receive a plurality of signals on a line of the set of lines in a noise region of the set of lines.

26 Claims, 26 Drawing Sheets

EXPANDED ELECTRONIC BUS COMMUNICATION CAPACITY

FIELD

The present disclosure relates generally to processing signals and in particular to a method and apparatus for sending signals over a bus. Still more particularly, the present disclosure relates to a method and apparatus for expanding communications channels into a noise region of the bus.

BACKGROUND

In a number of environments, a bus may comprise a number of lines connecting electronics equipment. The number of lines may carry signals in one direction or in two directions depending on the configuration of a communication system employing the lines. Design limitations of the communication system may result in only a portion of the communication capacity of the bus being utilized.

An example of a particular environment is a communication environment. An example of a particular bus within a communication environment is an aviation bus defined by the ARINC 429 specification. The ARINC 429 specification defines the physical and electrical interfaces of a bus for a communication system in an aircraft. The bus connects up to thirty one different pieces of electronics equipment in an aircraft to a data acquisition unit. Specifically, the ARINC 429 bus is a twisted shielded wire pair with connectivity known as the Mark 33 Digital Information Transfer System (DITS). Signals carrying data are sent in one direction on one wire to the data acquisition unit. Other signals are received from the data acquisition unit traveling in the opposite direction on the other wire.

The twisted shielded wire pair in the ARINC 429 specification and the Mark 33 Digital Information Transfer System provides high reliability and high resistance to interference. The high reliability and the high resistance to interference come at a cost. The cost includes wire weight and limited data rates. Furthermore, the ARINC 429 specification provides a bus that is unidirectional for transmission on one line and unidirectional for reception on another line. In addition, the ARINC 429 bus is currently limited to thirty one pieces of equipment and one data acquisition unit.

Accordingly, it would be advantageous to have a method and apparatus which takes into account one or more of the issues discussed above, as well as possibly other issues.

SUMMARY

In an embodiment, an apparatus comprises a bus network having a set of lines, and a number of second communication system devices associated with a number of electronics equipment connected to the bus network in which each second communication system device configures the electronics equipment to send and receive a plurality of signals on a line of the set of lines in a second frequency range that is masked from a number of first communication devices in each of the number of electronics equipment operating in a first frequency range on the bus.

In an embodiment, a communication system for an aircraft comprises a plurality of first communication system devices located in a number of electronics equipment connected by a pair of wires and configured for unidirectional communication in a first frequency range and in a first direction on a first wire of the pair of wires and for unidirectional communication in a second direction on a second wire of the pair of wires, and a plurality of second communication system devices associated with the plurality of electronics equipment and configured for bi-directional communication in a second frequency range on each of the first wire and the second wire.

In an embodiment, a method of sending signals over a set of lines comprises connecting a number of electronics equipment to a bus having a set of lines, associating a number of second communication system devices associated with the number of electronics equipment, and configuring each of the number of second communication system devices to send and to receive a plurality of signals on a line of the set of lines in a second frequency range masked from a number of first communication devices operating in a first frequency range on the bus and located in each of the number of electronics equipment.

In an embodiment, an apparatus comprises a bus network having a number of power cables, a number of communication system devices associated with a number of electronics equipment connected to the bus in which each communication system device configures the electronics equipment to send and receive a plurality of signals on a cable of the number of power cables in a frequency range comprising a noise region of the power cable, and an isolation coupler connected to a power converter for the communication device and to an output line of the power supply.

In an embodiment, a communication system for an aircraft comprises a number of electronics equipment connected by a power line, a plurality of communication system devices associated with the plurality of electronics equipment and configured for bi-directional communication in a frequency range on the power line, and a controller in each of the communication system devices configured to direct the transceiver to select a particular portion of the frequency range for sending or receiving a number of signals.

In an embodiment, a method of sending signals over a power line comprises connecting a number of electronics equipment to a bus having a number of power lines, associating a number of communication system devices with the number of electronics equipment, and configuring each of the number of communication system devices to send and to receive a plurality of signals on a line of the number of power lines in a frequency range.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
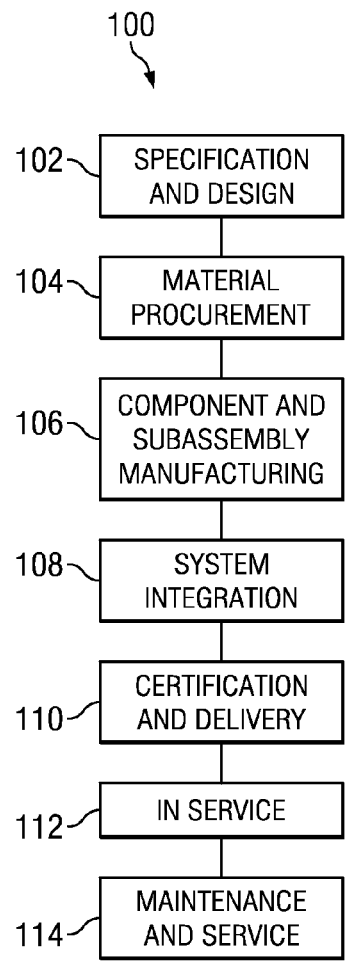
FIG. 1 is an illustration of an aircraft manufacturing and service method in accordance with an advantageous embodiment.
Figure 2:
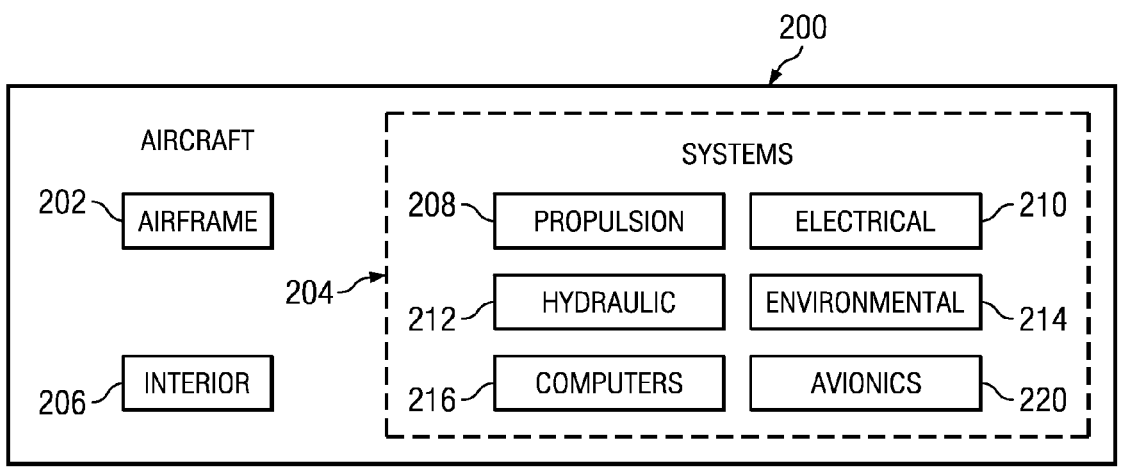
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in accordance with an advantageous embodiment. In this example, aircraft 200 may be produced by aircraft manufacturing and service method 100 in FIG. 1 and may include airframe 202 with a plurality of systems 204 and interior 206. Examples of plurality of systems 204 include one or more of propulsion 208, electrical 210, hydraulic 212, environmental 214, computers 216, and avionics 220. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, "a number" means one or more. As used herein, "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

The different advantageous embodiments recognize and take into account a number of different considerations. For example, the different advantageous embodiments recognize and take into account that there is a need for more bandwidth on existing ARINC 429 communication buses. The different advantageous embodiments recognize and take into account that there is a need for using the least number of wires or cable types because the cost of additional wire for connections is prohibitive in both money and weight.

The different advantageous embodiments recognize and take into account that there is a need to maximize the use of standard components. For example, "standard components" means components with a standard size and connectivity. Standard components reduce, by way of example, procurement overhead and material costs. Standard components improve manufacturing efficiency and reduce the complexity of process specifications. Further, by way of example, standard components minimize tooling, training, and documentation costs associated with the introduction of new wires or cables.

The different advantageous embodiments recognize and take into account a need to minimize the use of shielded wire or cables since labor needed to process shielded wire or cables is far in excess of that for unshielded wire or cables, regardless of whether the shielded wire or cable is single-line or multi-line.

The different advantageous embodiments recognize and take into account that ARINC 429 has a maximum bandwidth of 100 kilobits per second. In addition, the different advantageous embodiments recognize and take into account that ARINC 429 is limited to thirty one pieces of electronics equipment and one data acquisition unit. The different advantageous embodiments recognize and take into account that there is a need to obtain more information from the electronics connected to the ARINC 429 communication bus than the ARINC 429 specification allows.

The different advantageous embodiments recognize and take into account that the ARINC 429 communication bus has both high and low voltage signal paths and that these paths can be multiplexed without impacting wiring installations. Thus, for example, the different advantageous embodiments recognize that there is a need to use the existing ARINC 429 communications bus for additional bandwidth. The different advantageous embodiments recognize that there is a need to use the existing ARINC 429 communications bus for attachment of additional electronics devices.

The different advantageous embodiments recognize and take into account that ultra wide band pulses provide a low probability of interception or detection because the ultra wide band pulses are frequency agile, operate in a spread spectrum mode, and transmit in bursts.

The different advantageous embodiments recognize and take into account that it is desirable for the existing ARINC 429 bus and electronics equipment connected to the electronic bus to operate while a transceiver mode of operation with an unlimited number of devices also operates on the ARINC 429 bus. The different advantageous embodiments recognize and take into account that a number of devices that can be connected to an ARINC 429 bus by a superimposed transceiver mode of operation is limited only by a level of technology.

The different advantageous embodiments recognize and take into account a number of additional considerations. For example, ultra wide bandwidth communication uses less power. Ultra wide bandwidth allows more capabilities and higher bandwidth with limited or no changes to existing wiring. Ultra wide bandwidth can extend the life of existing ARINC 429 bus infrastructures and associated electronic circuit designs. Ultra wide bandwidth in conjunction with an existing ARINC 429 bus reduces the non-recurring and recurring cost associated with adding capabilities requiring higher communications bandwidths. Ultra wide bandwidth reduces the total number of unique wire and cable designs. Ultra wide bandwidth communication is easier to design for low emissions and susceptibility. Ultra wide bandwidth communication is easier to design to meet a broad range of security requirements.

The different advantageous embodiments recognize and take into account that a number of different interfaces may be used to connect ultra wide bandwidth communication devices to the ARINC 429 bus devices including capacitive coupling and inductive coupling. The different advantageous embodiments recognize and take into account that ARINC 429 cabling is a shielded 78 ohm twisted pair.

The different advantageous embodiments recognize and take into account that employing ultra wide band communications on the ARINC 429 shielded 78 ohm twisted pair supports adding new equipment and functions while retaining use of the existing infrastructure. The different advantageous embodiments recognize and take into account that ultra wide band signals support isolated content such as, for example, digitized data, audio, video, avionics, and non-avionics data between equipment on board an aircraft and off the aircraft.

The different advantageous embodiments recognize and take into account that ultra wide band circuitry may be implemented within a unit embedded within the ARINC 429 transmitter or receiver, that ultra wide band circuitry may be implemented within a unit isolated from the ARINC 429 transmitter or receiver, and that ultra wide band circuitry can operate with or without the ARINC 429 circuitry operating.

Thus, the different advantageous embodiments provide a method and apparatus to transmit signals. In an advantageous embodiment, an apparatus comprises a bus network having a set of lines, and a number of second communication system devices associated with a number of electronics equipment connected to the bus in which each second communication system device configures the electronics equipment to send and receive a plurality of signals on a line of the set of lines in a second frequency range masked from a number of first communication system devices in each of the number of electronics equipment operating in a first frequency range on the bus. As used herein, a "line" is any wire, cable, conductor, or medium configured for transmission of electric signals.

Figure 3:
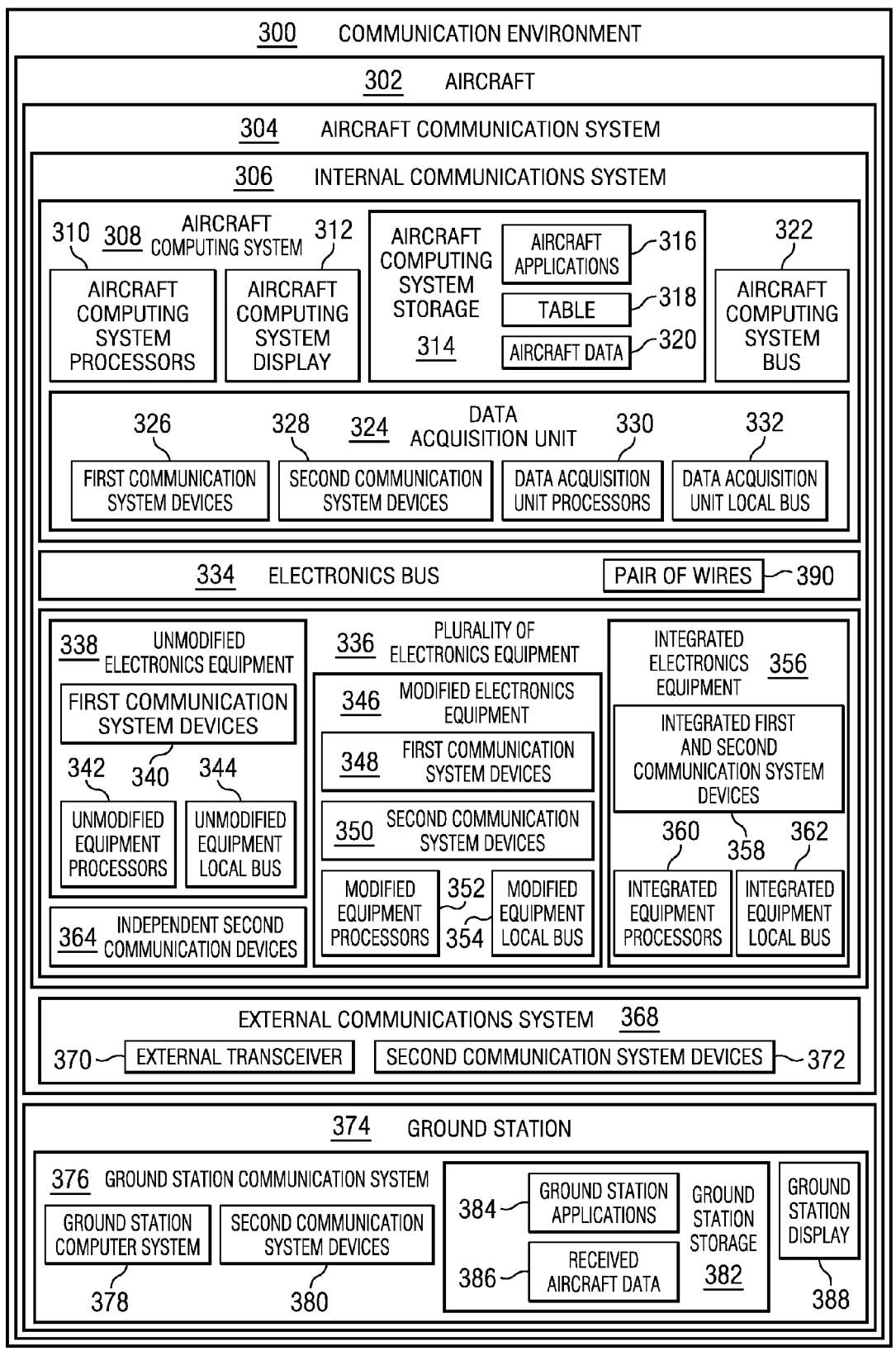
FIG. 3 is an illustration of a communication environment in which an advantageous embodiment may be implemented.

With reference now to FIG. 3, an illustration of an aviation environment is depicted in accordance with an advantageous embodiment. In this illustrative example, communication environment 300 comprises aircraft 302 and ground station 374. The different advantageous embodiments recognize and take into account that a number of aircraft such as aircraft 302 may be airborne and in communication with a number of ground stations such as ground station 374. Furthermore, in an advantageous embodiment aircraft 302 may be one of a manned aircraft or an unmanned aircraft. In an advantageous embodiment, aircraft 302 may be a spacecraft such as, for example, a space shuttle or a successor space craft to the space shuttle.

Aircraft 302 comprises aircraft communication system 304. Aircraft communication system 304 comprises internal communication system 306 and external communication system 368. Internal communication system 306 comprises aircraft computing system 308, electronics bus 334, and plurality of electronics equipment 336. Aircraft computing system 308 comprises aircraft computing system processors 310, aircraft computing system display 312, and aircraft computing system storage 314. Aircraft computing system storage 314 comprises aircraft applications 316, table 318, and aircraft data 320. Aircraft computing system 308 further comprises data acquisition unit 324 and aircraft computing system bus 322. Data acquisition unit 324 comprises first communication system devices 326, second communication system devices 328, data acquisition unit processors 330, and data acquisition unit local bus 332.

As used herein, "first communication system device" means a device located in an electronics equipment and having a transmitter and a receiver, in which the transmitter is configured for unidirectional transmission on one line of a set of lines in a first frequency range and in which the receiver is configured for unidirectional reception on another line of the set of lines in the first frequency range. An example of a first communication system device is first communication system device 400 in FIG. 4.

As used herein, "second communication system device" means a device associated with an electronics equipment connected to the bus and in which the second communication system device configures the electronics equipment to send and receive a plurality of signals on a line of the set of lines in a second frequency range masked from a number of first communication system devices in each of the number of electronics equipment operating in a first frequency range on the bus. An example of a second communication system device may be second communication system device 500 in FIG. 5.

Aircraft computing system bus 322 connects aircraft computing system processors 310, aircraft computing system display 312, aircraft computing system storage 314 and data acquisition unit 324.

In an advantageous embodiment, data acquisition unit 324 may be connected to plurality of electronics equipment 336 by electronics bus 334. In an advantageous embodiment, electronics bus 334 comprises connecting pair of wires 390. In an advantageous embodiment, the connecting pair of wires 390 may be a shielded wire pair configured to an ARINC 429 specification. The different advantageous embodiments recognize and take into account that any number of shielded wire pair configurations may be employed to provide a bus connection for the plurality of equipment. In addition, the different advantageous embodiments recognize and take into account that single conductors may be utilized within electronics bus 334.

Plurality of electronics equipment 336 comprises at least one of a number of unmodified electronics equipment 338, a number of modified electronics equipment 346, a number of integrated electronics equipment 356, and a number of independent second communication devices 364.

In an advantageous embodiment, electronics equipment may be any electronics equipment configured for connection to a bus. For example, electronics equipment may be configured for connectivity to a bus by having a pair of transmission ports and a pair of receiving ports for connecting to the bus. An example of electronics equipment may be a flight control computer configured to connectivity and communication on an ARINC 429 bus in which a number of second communication system devices has been installed. Other examples of electronics equipment may be a flight management computer, a thrust control computer, a inertial reference system, an attitude and heading reference system, an air data system, a radio altimeter, an airborne weather radar, a global positioning system, or any other avionics equipment.

In an advantageous embodiment, unmodified electronics equipment has a number of first communication system devices located within it and connected to the bus. For example, in an aviation environment, unmodified electronics equipment may be a flight control computer configured for connectivity and communication on an ARINC 429 bus. Other examples of unmodified electronics equipment may be a flight management computer, a thrust control computer, a inertial reference system, an attitude and heading reference system, an air data system, a radio altimeter, an airborne weather radar, a global positioning system, or any other avionics equipment configured for communication on a bus in a first frequency range by a number of first communication system devices.

In an advantageous embodiment, each unmodified device 338 comprises a number of first communication system devices 340, a number of unmodified equipment processors 342, and an unmodified equipment local bus 344. In an advantageous embodiment, unmodified local equipment bus 344 connects first communication system devices 340 to the number of equipment processors 342. First communication system devices 340 connect unmodified equipment local bus 344 to electronics bus 334. In an advantageous embodiment, unmodified electronics equipment 338 comprises a same size for location in aircraft 302 and a same connectivity to electronics bus 334 as each of the number of unmodified electronics equipment 338.

In an advantageous embodiment, modified electronics equipment may be an electronics equipment having a number of first communication system devices located within it, and also a number of second communication system devices located within it and connected to a bus and to the electronics equipment. For example, in an aviation environment, modified electronics equipment may be a flight control computer configured for connectivity and communication on an ARINC 429 bus in which a number of second communication devices has been installed. Other examples of modified electronics equipment may be a flight management computer, a thrust control computer, a inertial reference system, an attitude and heading reference system, an air data system, a radio altimeter, an airborne weather radar, a global positioning system, or any other avionics equipment configured for communication on a bus in a first frequency range by a number of first communication system devices and having a number of second communication system devices located in it and connected to the bus and to the electronics equipment.

In an advantageous embodiment, modified electronics equipment 346 comprises a number of first communication system devices 348, a number of second communication system devices 350, a number of modified equipment processors 352, and modified equipment local bus 354. In an advantageous embodiment, modified local equipment bus 354 connects first communication system devices 348 to the number of modified equipment processors 352. First communication system devices 348 connect modified equipment local bus 354 to electronics bus 334. In an advantageous embodiment, modified electronics equipment 346 comprises a same size for location in aircraft 302 and a same connectivity to electronics bus 334 as each of the number of unmodified electronics equipment 338.

As used herein, integrated electronics equipment may be electronics equipment having an integrated first and second communication system device located within it and configured for connectivity to the bus. For example, in an aviation environment, integrated electronics equipment may be a flight control computer configured for connectivity to and communication on an ARINC 429 bus in which a number of integrated first and second communication system devices have been incorporated in place of either a number of first communication system devices and/or a number of second communication system devices. Other examples of an integrated electronics equipment may be a flight management computer, a thrust control computer, a inertial reference system, an attitude and heading reference system, an air data system, a radio altimeter, an airborne weather radar, a global positioning system, or any other avionics equipment configured for communication on a bus in a first frequency range and a second frequency range in accordance with the integrated fist and second communication system device.

In an advantageous embodiment, integrated devices 356 comprise integrated first and second communication system devices 358, integrated equipment processors 360, and integrated equipment local bus 362. In an advantageous embodiment, integrated local equipment bus 362 connects integrated first and second communication system devices 358 to the number of integrated equipment processors 360. Integrated first and second communication system devices 358 connect integrated equipment local bus 362 to electronics bus 334. In an advantageous embodiment, each of the number of integrated electronics equipment 356 comprises a same size for location in aircraft 302 and a same connectivity to electronics bus 334 as each of the number of unmodified electronics equipment 338.

External communication system 368 comprises external transceiver 370 and second communication system devices 372. External transceiver 370 may be configured to send and receive signals from data acquisition unit 324, unmodified electronics equipment 338, modified electronics equipment 346, integrated electronics equipment 356, and ground station 374. External transceiver 370 may be configured by second communication system devices 372 to communicate through electronics bus 334 with data acquisition unit 324, modified electronics equipment 346, integrated electronics equipment 356, and ground station 374. Ground Station 374 may comprise ground station communication system 376. Ground station communication system 376 may comprise ground station computer system 378, second communication system devices 380, ground station storage 382 and ground station display 388. Ground station storage 382 may comprise ground station applications 384 and received aircraft data 386.

In the illustrative embodiments and examples, signals are sent by and to electronics equipment along electronic bus. An example of a signal flow may be provided in FIG. 6. As used herein, "signals" mean electronic pulses that carry information. As used herein, "Information" comprises at least one of data, audio, video, commands, program code and other information.

The illustration of communications environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Although the different advantageous embodiments have been described with respect to an aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a space station, a satellite, a surface ship, a power plant, a dam, a manufacturing facility, a building, and/or some other suitable object.

Figure 4:
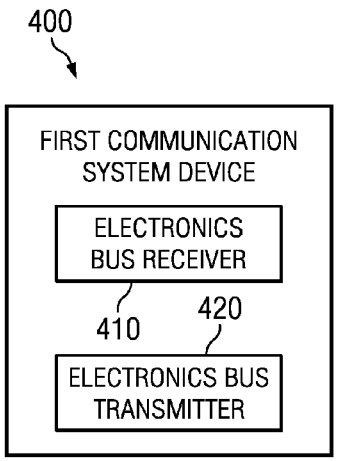
FIG. 4 is an illustration of a first communication system device in which an advantageous embodiment may be implemented.

FIG. 4 is an illustration of a first communication system device system in which an advantageous embodiment may be implemented. Turning to FIG. 4, first communication system device 400 comprises electronics bus receiver 410 and electronics bus transmitter 420. First communication system device 400 may be one of first communication system devices 326, 340, and 348 in FIG. 3. In an embodiment, first communication system device 400 may be located in each of a number of electronics equipment such as unmodified electronics equipment 338 and modified electronics equipment 346 in FIG. 3. In an embodiment, electronic bus receiver 410 may be configured for unidirectional reception on one line of the set of lines in the first frequency range, and electronic bus transmitter 420 may be configured for unidirectional transmission on another line of the set of lines in the first frequency range.

Figure 5:
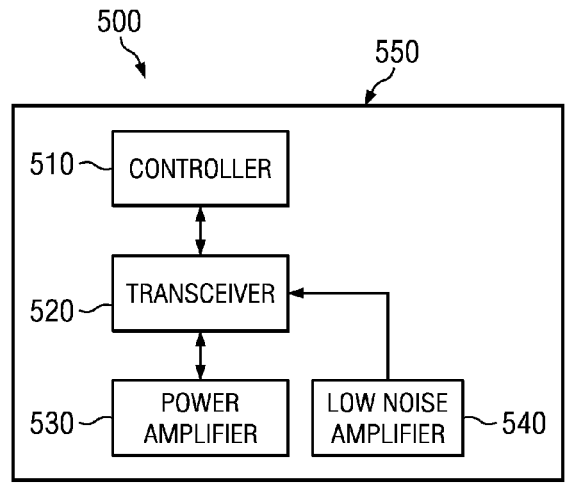
FIG. 5 is an illustration of a second communication system device in which an advantageous embodiment may be implemented.

FIG. 5 is an illustration of a second communication system device in which an advantageous embodiment may be implemented. Turning to FIG. 5, second communication system device 500 comprises controller 510, transceiver 520, power amplifier 530, low noise amplifier 540, and connector 550. Second communication system device 500 may be a device such as second communication system devices 328, 350, 372, and 380 of FIG. 3. Second communication system device 500 may be associated with a number of electronics equipment such as data acquisition unit 324, modified electronics equipment 346, external communication system 368, and ground station communication system 376 of FIG. 3. Second communication system device 500 may be connected to a bus such as electronics bus 334 of FIG. 3. Second communication system device may configure electronics equipment such as data acquisition unit 324, modified electronics equipment 346, external communication system 368, and ground station communication system 376 of FIG. 3 to send and receive a plurality of signals on a line of the set of lines in a second frequency range masked from a number of first communication system devices in each of the number of electronics equipment operating in a first frequency range on electronic bus 334 of FIG. 3.

Figure 6:
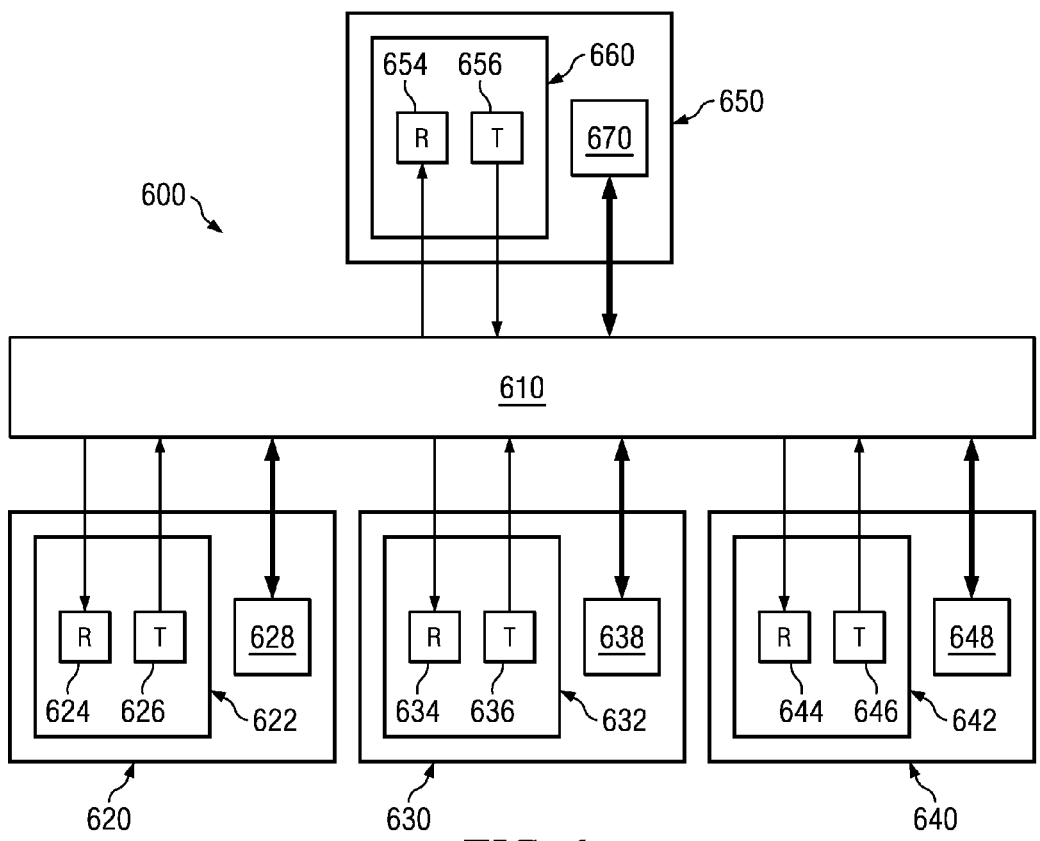
FIG. 6 is an illustration of a data acquisition system in which an advantageous embodiment may be implemented.

FIG. 6 is an illustration of a data acquisition system in which an advantageous embodiment may be implemented. Turning to FIG. 6, data acquisition system 600 is illustrated in accordance with an advantageous embodiment. In this example, electronic bus 610 connects a number of electronics equipment 620, 630, 640 and 650. Electronics equipment 620 comprises first communication system device 622 and second communication system device 628. First communication system device 622 comprises receiver 624 and transmitter 626. Receiver 624 receives signals in one direction from electronic bus 610.

Transmitter 626 sends signals in the opposite direction to electronic bus 610. Second communication system device 628 sends and receives signals to and from electronic bus 610 in two directions. In the same manner, electronics equipment 630 comprises first communication system device 632 and second communication system device 638. First communication system device 632 comprises receiver 634 and transmitter 636. Receiver 634 receives signals in one direction from electronic bus 610. Transmitter 636 sends signals in the opposite direction to electronic bus 610. Second communication system device 638 sends and receives signals to and from electronic bus 610 in two directions. Likewise, electronics equipment 640 comprises first communication system device 642 and second communication system device 648. First communication system device 642 comprises receiver 644 and transmitter 646. Receiver 644 receives signals in one direction from electronic bus 610. Transmitter 646 sends signals in the opposite direction to electronic bus 610. Second communication system device 648 sends and receives signals to and from electronic bus 610 in two directions. In the same manner, electronics equipment 650 comprises first communication system device 660 and second communication system device 670. First communication system device 660 comprises receiver 654 and transmitter 656. Receiver 654 receives signals in one direction from electronic bus 610. Transmitter 656 sends signals in the opposite direction to electronic bus 610. Second communication system device 648 sends and receives signals to and from electronic bus 610 in two directions.

Figure 7:
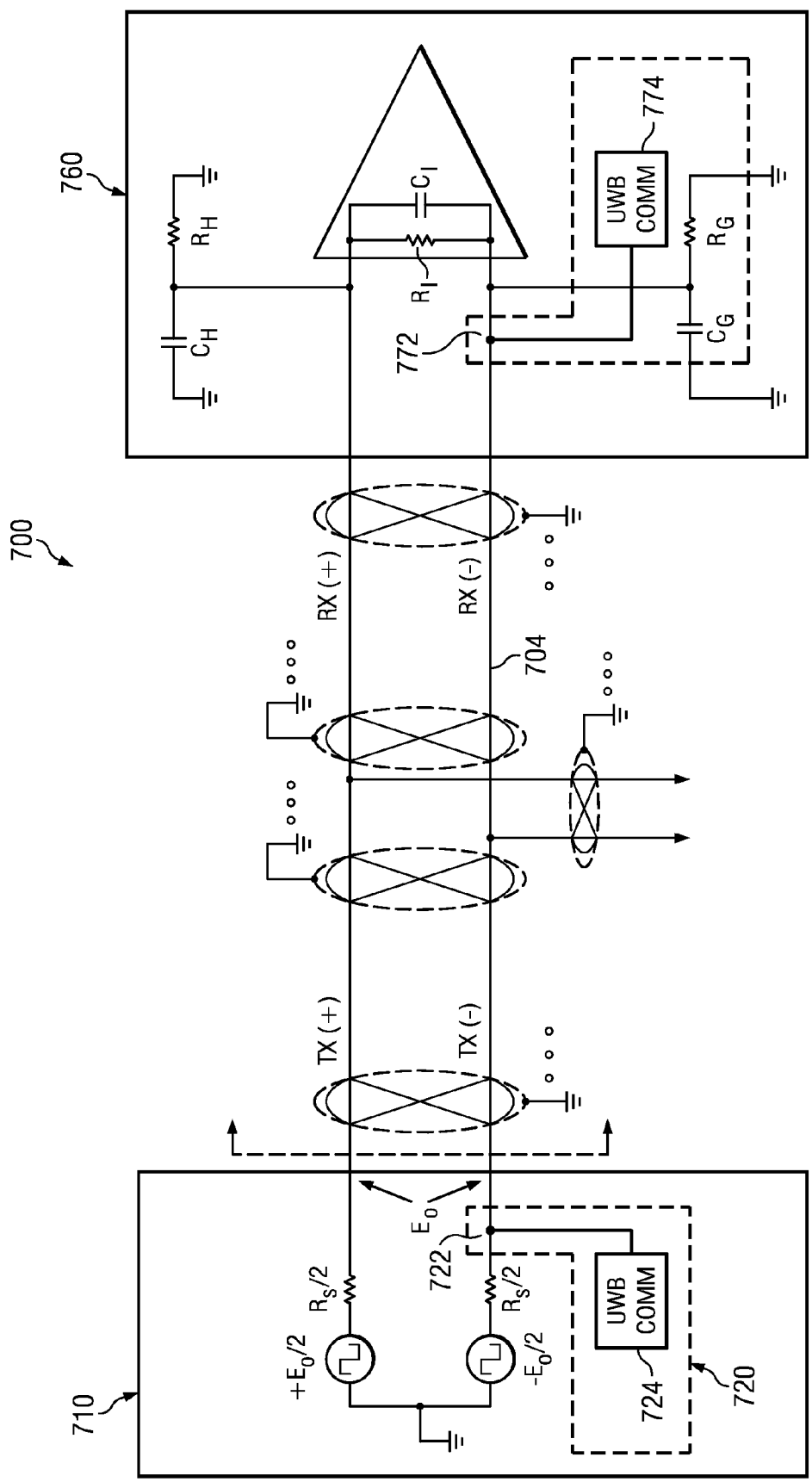
FIG. 7 is an illustration of a data acquisition system in which an advantageous embodiment may be implemented.

FIG. 7 is an illustration of a data acquisition system in which an advantageous embodiment may be implemented. Turning to FIG. 7, transmitter 720 may be modified by connecting second communication system device 724 to transmitter 710. Correspondingly, receiver 760 comprises been modified by adding second communication system device 774 to receiver 760. Second communication system device 724 may be connected to low voltage line 704 at direct connection 722. Second communication system device 774 may be connected to low voltage line 704 at direct connection 772.

Figure 8:
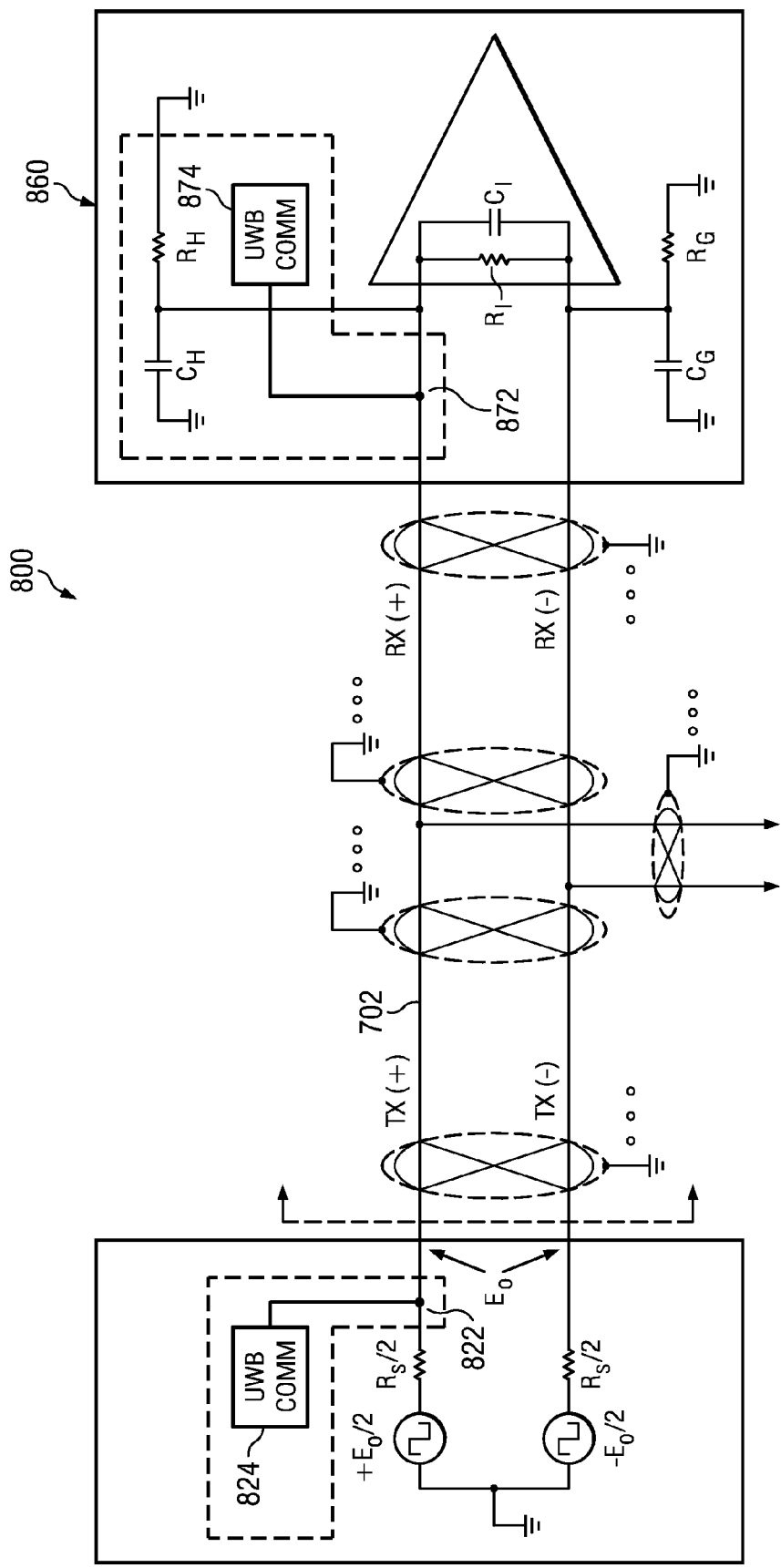
FIG. 8 is an illustration of a data acquisition system in which an advantageous embodiment may be implemented.

FIG. 8 is an illustration of a data acquisition system in which an advantageous embodiment may be implemented. In FIG. 8, data acquisition system 800 comprises second communication system device 824 connected to high voltage line 702 at direct connection 822. Correspondingly, receiver 860 comprises second communication system device 874 connected to high voltage line 702 at connection 872.

Figure 9:
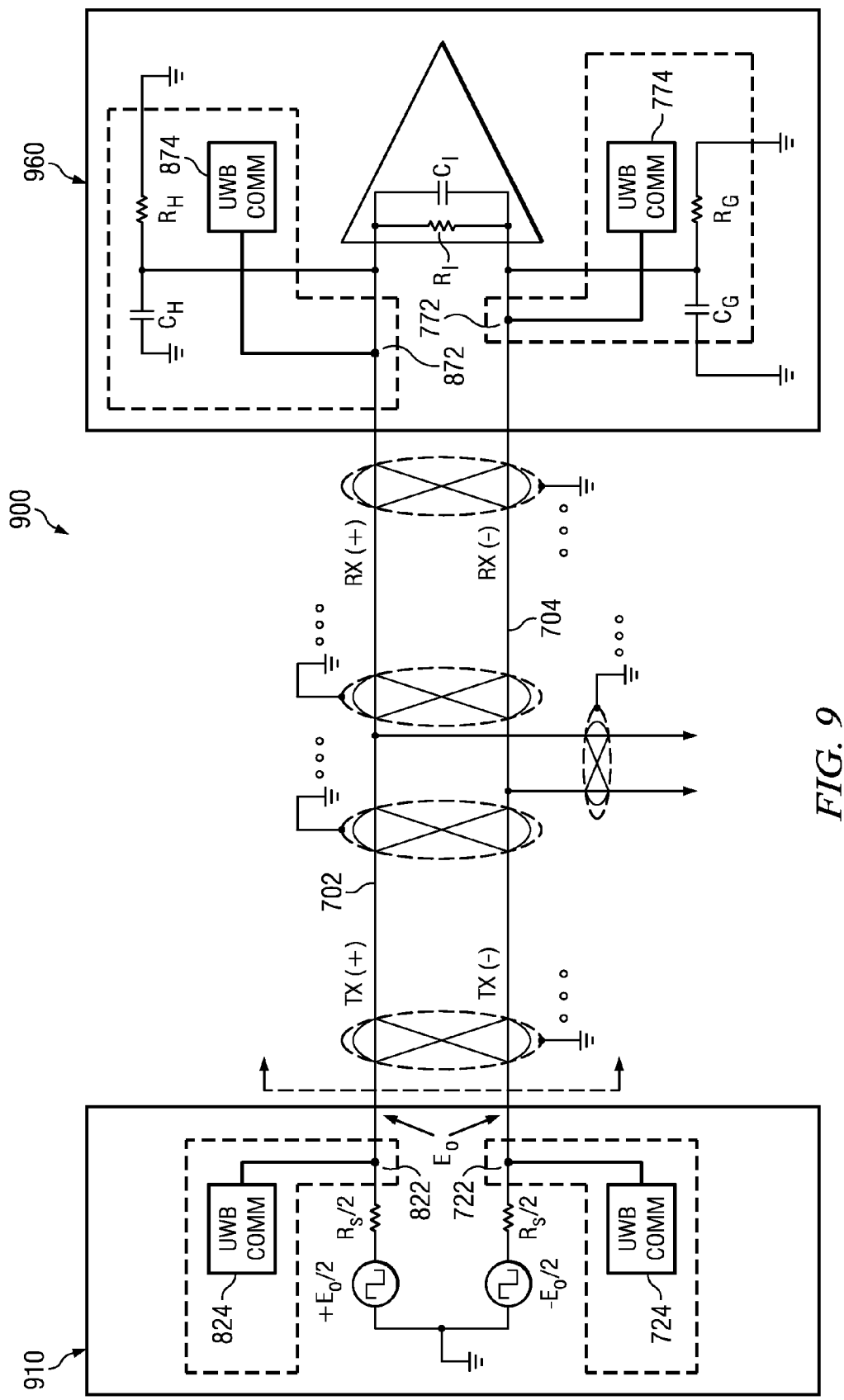
FIG. 9 is an illustration of a data acquisition system in which an advantageous embodiment may be implemented.

FIG. 9 is an illustration of a data acquisition system in which an advantageous embodiment may be implemented. Transmitter 910 has been modified by adding second communication system device 724 to transmitter 910 and second communication system device 824 to transmitter 910. Second communication system device 724 may be connected to low voltage line 704 at direct connection 722. Second communication system device 774 may be connected to low voltage line 704 at direct connection 722. Second communication device 824 may be connected to high voltage line 702 at direct connection 822. Correspondingly, receiver 860 has been modified by adding second communication system device 774 and second communication system device 874. Second communication system device 774 may be connected to low voltage line 704 at connection 772. Second communication system device 874 may be connected to high voltage line 702 at connection 872.

Figure 10:
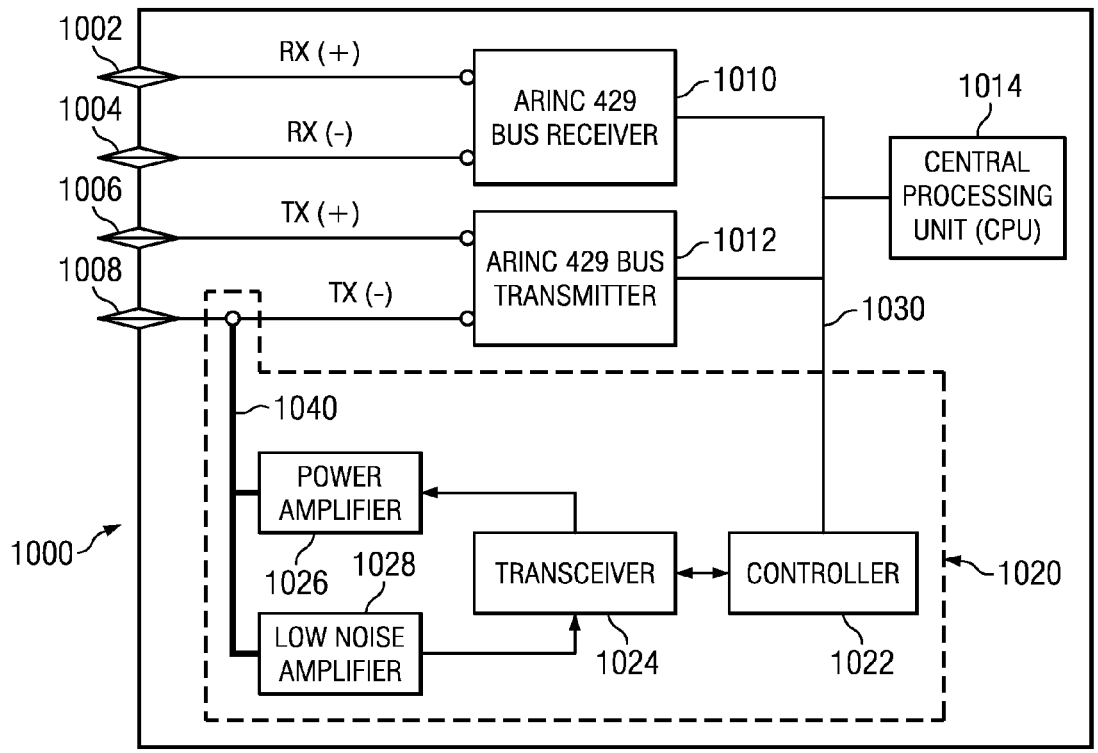
FIG. 10 is an illustration of a modified electronics equipment in which an advantageous embodiment may be implemented.

FIG. 10 is an illustration of a modified electronics equipment in which an advantageous embodiment may be implemented. Turning to FIG. 10, modified electronics equipment 1000 is illustrated. Modified electronics equipment 1000 comprises receiver 1010, transmitter 1012, central processing unit 1014, local bus 1030, and second communication system device 1020. Receiver 1010 may be connected to local bus 1030 and to high voltage receiving wire 1002 and to low voltage receiving wire 1004. Transmitter 1012 may be connected to local bus 1030 and to high voltage transmission wire 1006 and to low voltage transmission wire 1008. Second communication system device 1020 comprises controller 1022 and transceiver 1024. Second communication system device 1020 further comprises power amplifier 1026 and low noise amplifier 1028. In this example, second communication system device 1020 connects to low voltage transmission wire 1008 by line 1040.

Figure 11:
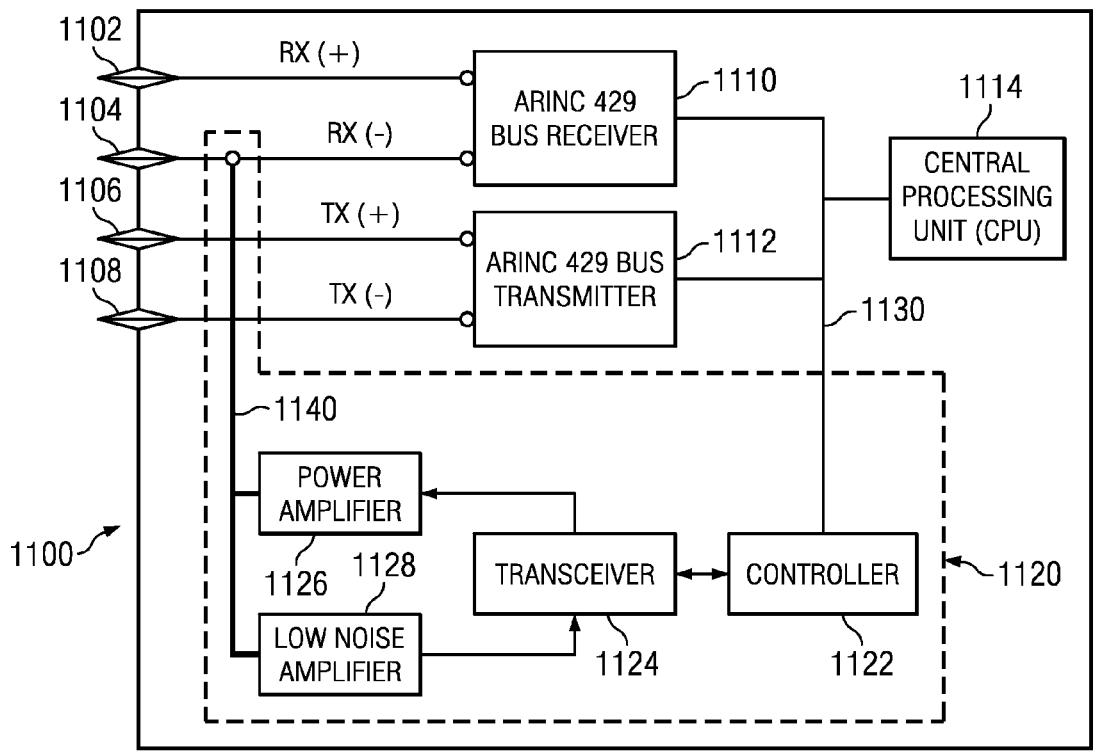
FIG. 11 is an illustration of a modified electronics equipment in which an advantageous embodiment may be implemented.

FIG. 11 is an illustration of a modified electronics equipment in which an advantageous embodiment may be implemented. Turning to FIG. 11, modified electronics equipment 1100 comprises receiver 1110, transmitter 1112, central processing unit 1114, local bus 1130, and second communication system device 1120. Receiver 1110 may be connected to local bus 1130 and to high voltage receiving wire 1102 and to low voltage receiving wire 1104. Transmitter 1112 may be connected to local bus 1130 and to high voltage transmission wire 1106 and to low voltage transmission wire 1108. Second communication system device 1120 comprises controller 1122 and transceiver 1124. Second communication system device 1120 further comprises power amplifier 1126 and low noise amplifier 1128. In this example, second communication system device 1120 connects to low voltage receiving wire 1104 by line 1140.

Figure 12:
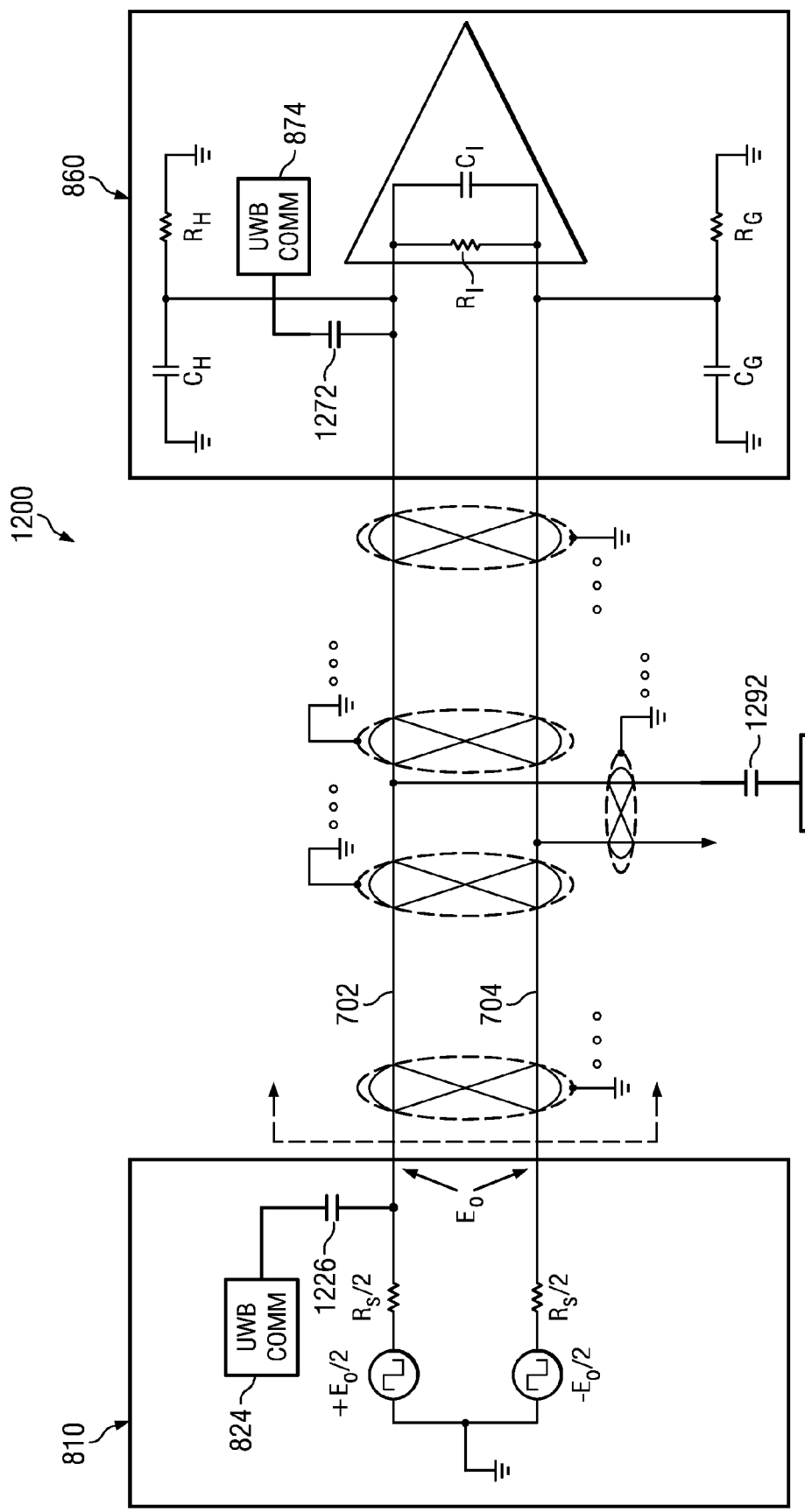
FIG. 12 is an illustration of a data acquisition system in which an advantageous embodiment may be implemented.

FIG. 12 is an illustration of a data acquisition system in which an advantageous embodiment may be implemented. Turning to FIG. 12, data acquisition system 1200 comprises transmitting unit 810, second communication system device 824, receiving unit 860, and second communication systems device 874 of FIG. 8. In the advantageous embodiment of FIG. 12, second communication system device 824 may be connected to high voltage wire 702 by capacitive connection 1226. In the example of FIG. 12, second communication systems device 874 may be connected to high voltage wire 702 by capacitive connection 1272. Furthermore, in the example of FIG. 12, second communication system device 1290 may be connected to high voltage wire 702 by capacitive connection 1292.

Figure 13:
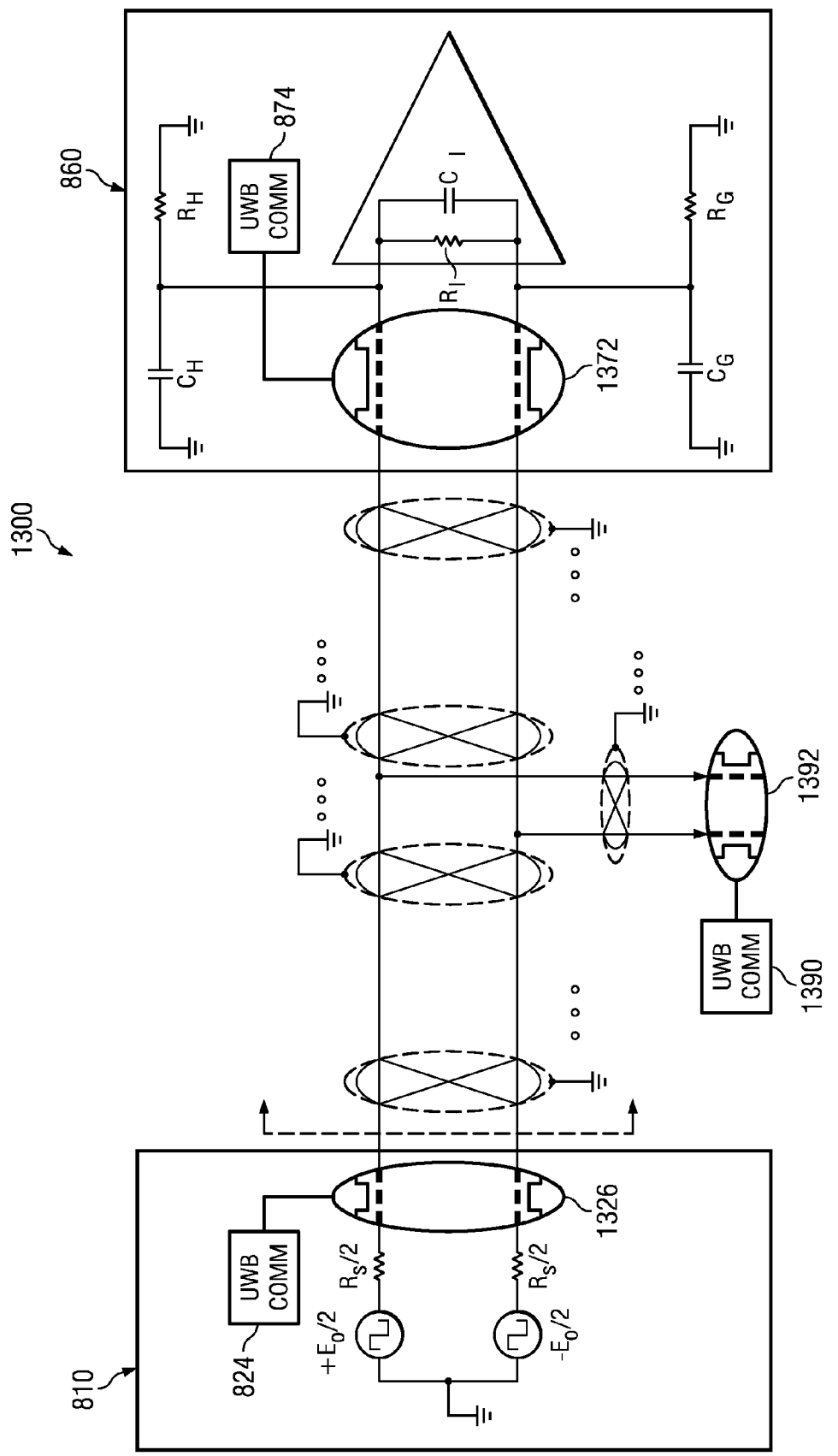
FIG. 13 is an illustration of a data acquisition system in which an advantageous embodiment may be implemented.

FIG. 13 is an illustration of a data acquisition system in which an advantageous embodiment may be implemented. Turning to FIG. 13, data acquisition system 1300 comprises transmitting unit 810, second communication system device 824, receiving unit 860, and second communication system device 874 of FIG. 8. In the advantageous embodiment of FIG. 13, second communication system device 824 may be connected to high voltage wire 602 by inductive connection 1326. In the example of FIG. 13, second communication system device 874 may be connected to high voltage wire 602 by inductive connection 1372. Furthermore, in the example of FIG. 13, second communication system device 1390 may be connected to high voltage wire 602 by inductive connection 1392.

Figure 14:
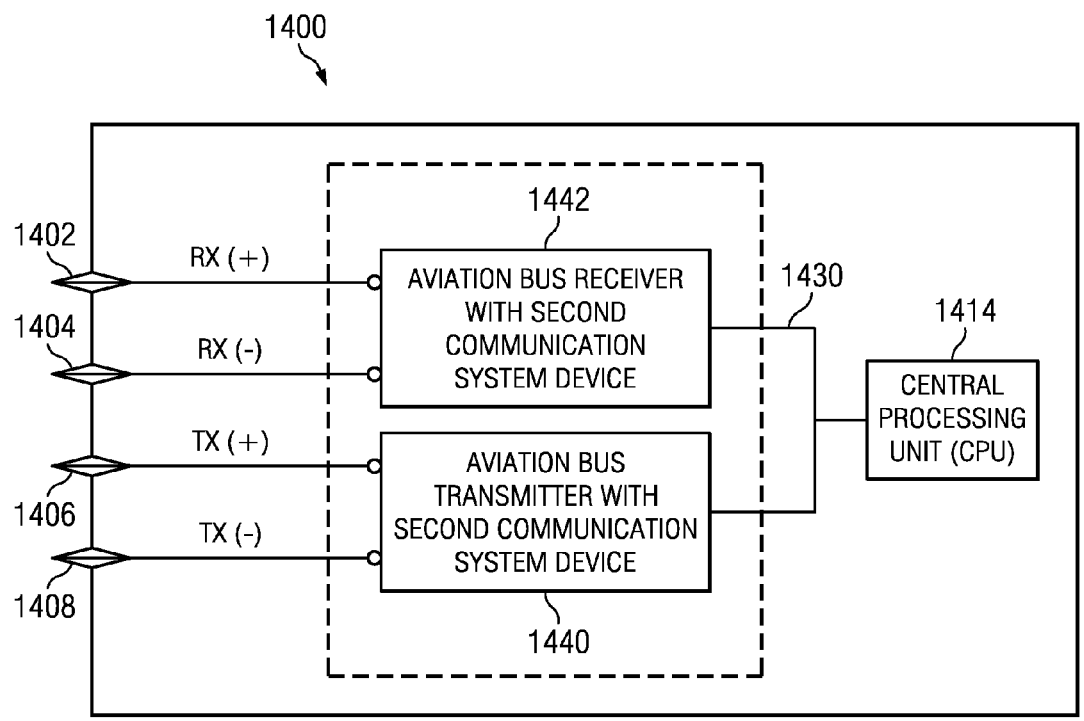
FIG. 14 is an illustration of an electronics equipment in which an advantageous embodiment may be implemented.

FIG. 14 is an illustration of equipment in which an advantageous embodiment may be implemented. FIG. 14 illustrates integrated electronics equipment. Integrated electronics equipment 1400 comprises integrated receiver 1442, integrated transmitter 1440, central processing unit 1414, local bus 1430. Integrated receiver 1442 may be connected to local bus 1430 and to high voltage receiving wire 1402 and to low voltage receiving wire 1404. Integrated transmitter 1440 may be connected to local bus 1430 and to high voltage transmission wire 1406 and to low voltage transmission wire 1408.

Figure 15:
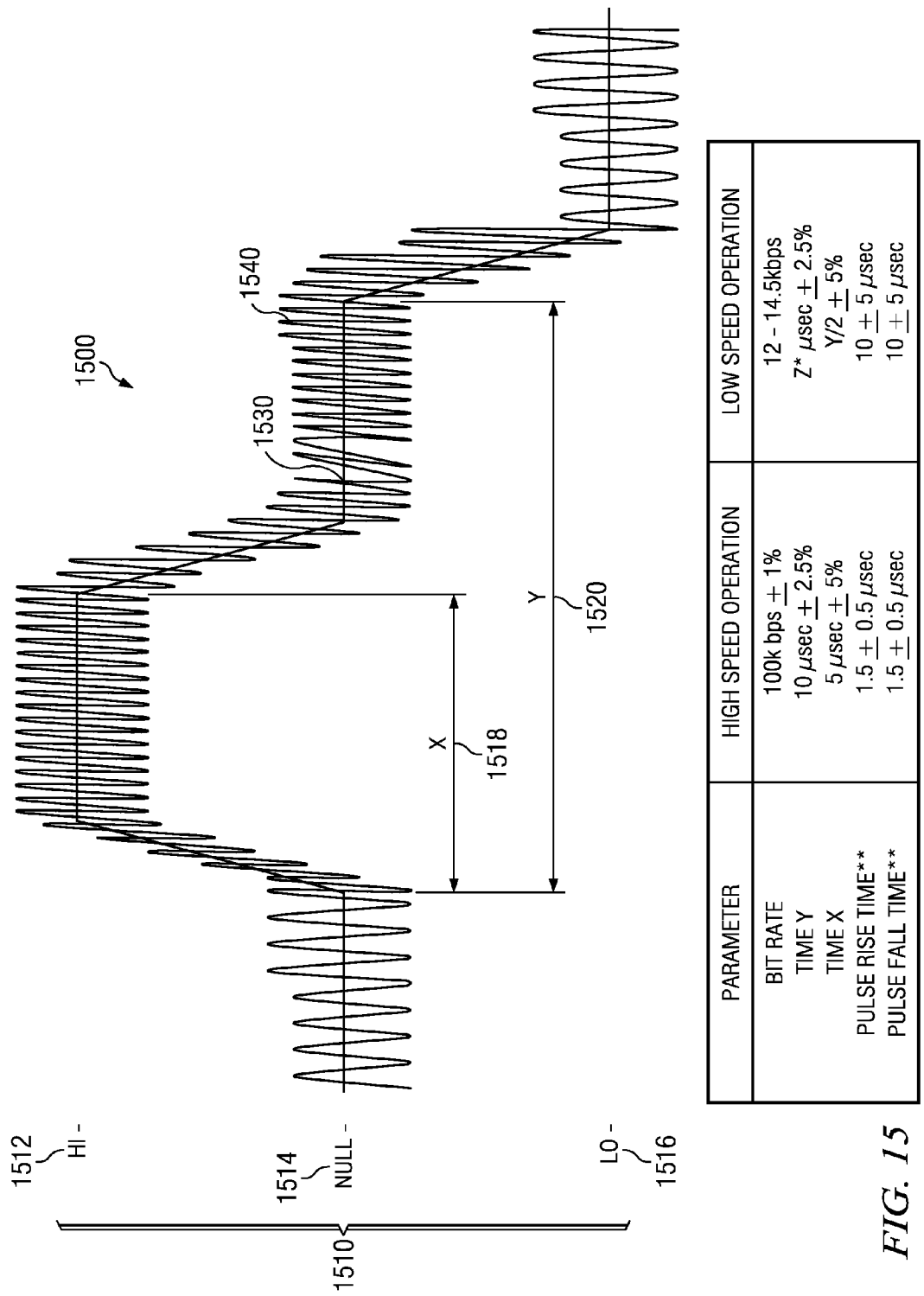
FIG. 15 is an illustration of a waveform in which an advantageous embodiment may be implemented.

FIG. 15 is an illustration of a waveform in which an advantageous embodiment may be implemented. Turning to FIG. 15, a signal for second communication system devices is illustrated. In the example, the ARINC 429 waveform is shown with a second communication system device signal shown. Second communication system devices transmit and receive signals in a second range distinct from a first range of first communication system devices. In an embodiment, second range may be 3.1 gigahertz to 10.3 gigahertz. In an embodiment, frequencies can be lower than 3.1 gigahertz. In an embodiment, frequencies can be higher than 10.3 gigahertz. In an embodiment, amplitudes may be limited by transmitter and receiver maximum levels per frequency of operation. In an embodiment, the selection of signal frequencies and of amplitudes to be used may be limited by the noise region threshold of the communications bus in which the ultra wide band signals are being multiplexed. The combination of frequencies and amplitudes may be selected to operate within the noise region of the base communicate bus signals.

Figure 16:
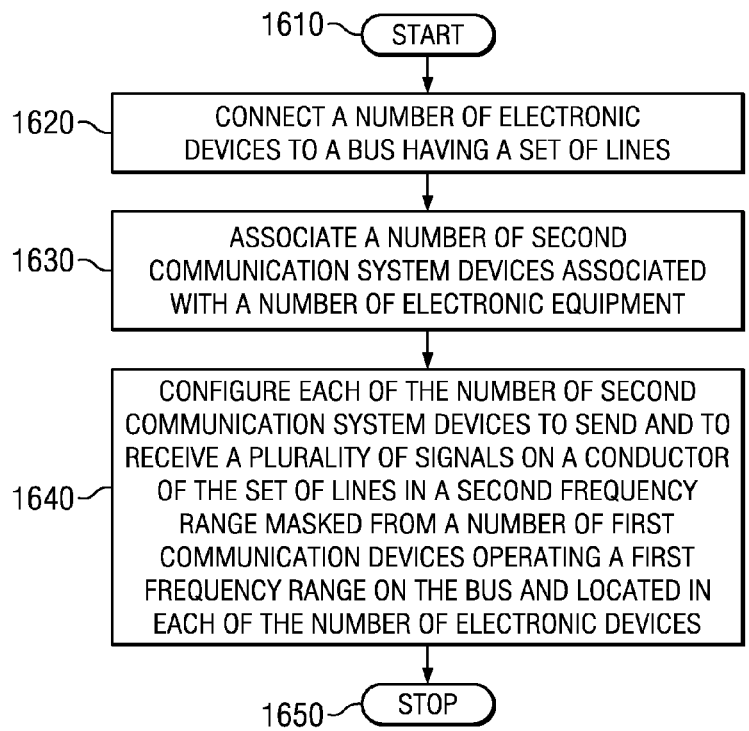
FIG. 16 is an illustration of a flowchart of a process in which sending a signal on a second communication system in an advantageous embodiment is implemented.

FIG. 16 is an illustration of a flowchart of a process in which sending a signal on a second communication system device in an advantageous embodiment may be implemented. Process 1600 may be a method of sending signals over a set of lines such as may be found in electronic bus 334 of FIG. 3. Process 1600 starts (1610) and connects a number of electronics equipment to a bus having a set of lines (1620). Next, a number of second communication system devices may be associated with the number of electronics equipment (1630). The second communication system devices may be second communication system devices such as 328, 350, 372, and 380 of FIG. 3. Second communication system devices may be such a second communication device 500 of FIG. 5. Then, process 1600 configures each of the number of second communication system devices to send and to receive a plurality of signals on a line of the set of lines in a second frequency range masked from a number of first communication devices operating in a first frequency range on the bus and located in each of the number of electronics equipment (1640). Process 1600 stops (1650).

Figure 17:
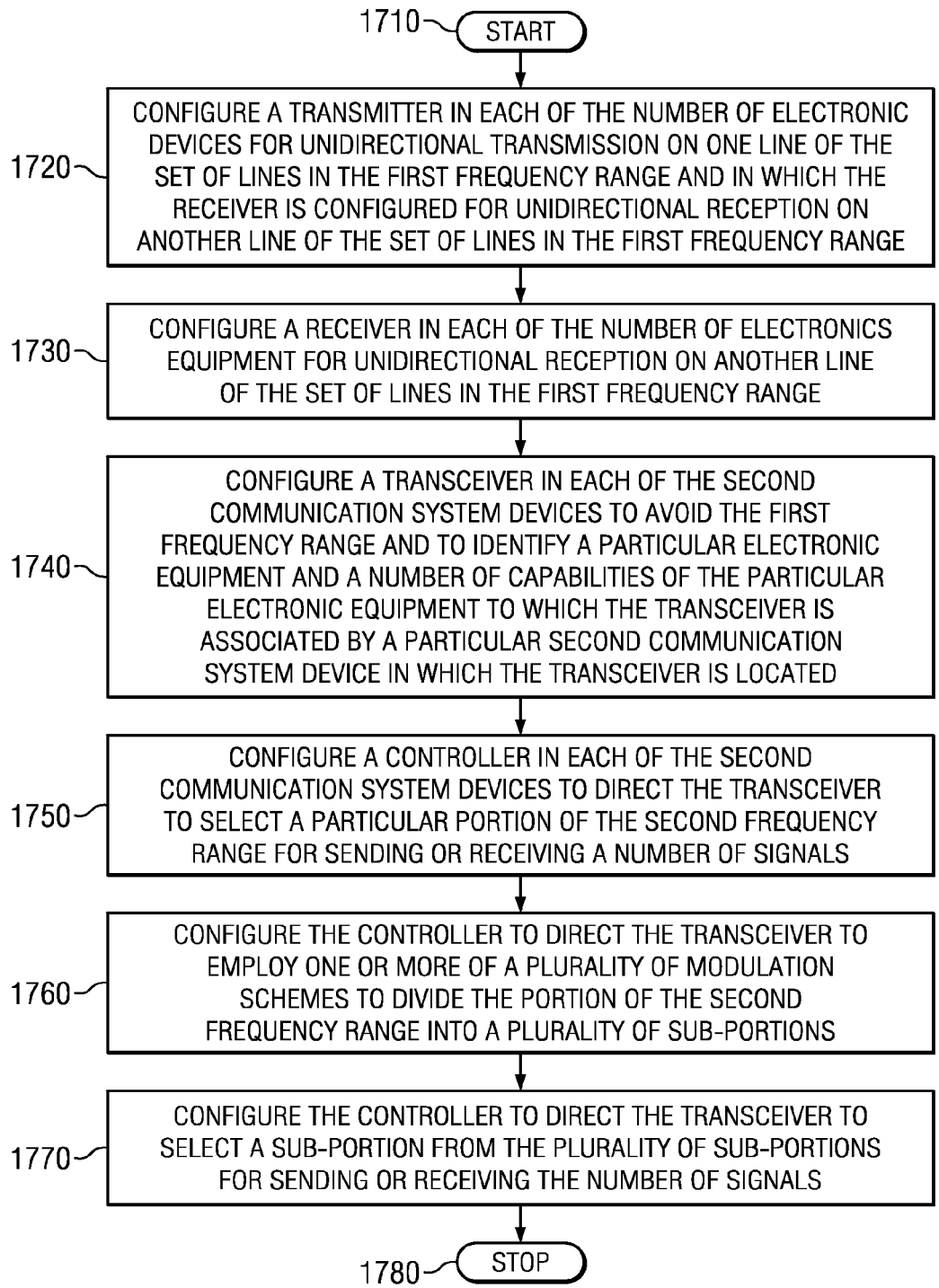
FIG. 17 is an illustration of a flowchart of a process in which configuration of a second communication device is implemented in an advantageous embodiment.

FIG. 17 is an illustration of a flowchart of a process in configuration of a second communication device may be implemented in an advantageous embodiment. Process 1700 begins (1710) and configures a transmitter in each of the number of electronics equipment for unidirectional transmission on one line of the set of lines in the first frequency range and in which the receiver may be configured for unidirectional reception on another line of the set of lines in the first frequency range (1720). The transmitter may be a transmitter such as electronic bus transmitter 420 of second communication device 400 in FIG. 4. Next, process 1700 configures a receiver in each of the number of electronics equipment for unidirectional reception on another line of the set of lines in the first frequency range (1730). The receiver may be a receiver such as electronic bus receiver 410 of second communication system device 400 in FIG. 4. Process 1700 configures a transceiver in each of the second communication system devices to avoid the first frequency range and to identify a particular electronics equipment and a number of capabilities of the particular electronics equipment to which the transceiver may be associated by a particular second communication system device in which the transceiver may be located (1740). The transceiver may be a transceiver such as transceiver 520 of second communication system device 500 in FIG. 5. Process 1700 configures a controller in each of the second communication system devices to direct the transceiver to select a particular portion of the second frequency range for sending or receiving a number of signals (1750). The controller may be a controller such as controller 510 in second communication system device 500 of FIG. 5. Process 1700 configures the controller to direct the transceiver to employ one or more of a plurality of modulation schemes to divide the portion of the second frequency range into a plurality of sub-portions (1760). Process 1700 configures the controller to direct the transceiver to select a sub-portion from the plurality of sub-portions for sending or receiving the number of signals (1770). The sub-portions may be recorded in a table such as table 318 of aircraft computing system storage 314 in FIG. 3. Process 1700 stops (1780).

Figure 18:
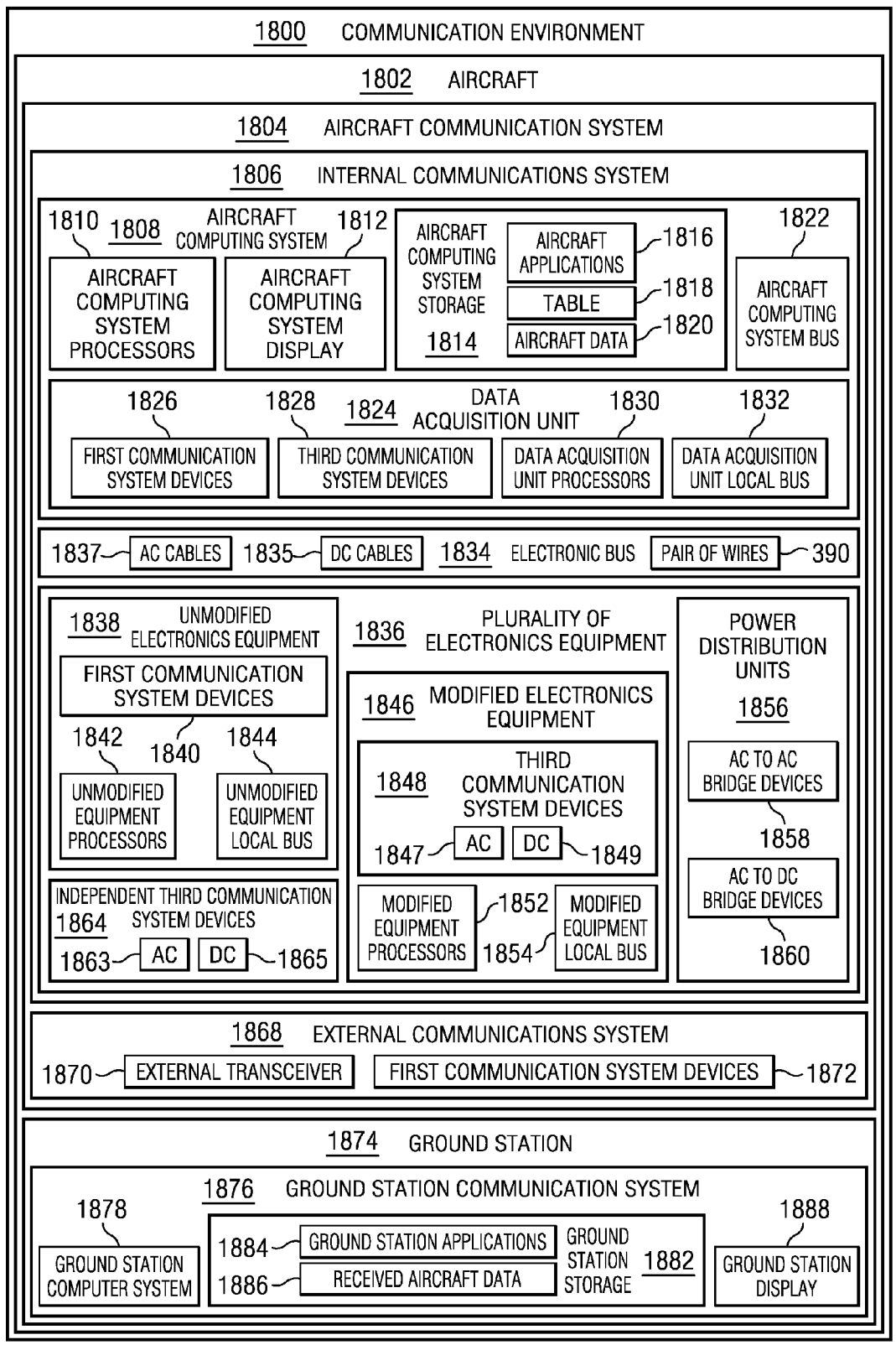
FIG. 18 is an illustration of a communication environment in which an advantageous embodiment may be implemented.

With reference now to FIG. 18, an illustration of an aviation environment is depicted in accordance with an advantageous embodiment. The advantageous embodiment of FIG. 18 recognizes and takes into account the advantages of wide frequency pulses communicating in a noise region of a power system's cable network. The advantageous embodiment further recognizes and takes into account varying amplitude pulses communicating in a noise region of a power system's cable network. The advantageous embodiments further recognize and take into account multiple channels for communicating in a noise region of a power system's cable network. The advantageous embodiments further recognize and take into account varying modulation schemes operating in a power system's noise region.

In this illustrative example, communication environment 1800 comprises aircraft 1802 and ground station 1874. The different advantageous embodiments recognize and take into account that a number of aircraft such as aircraft 1802 may be airborne and in communication with a number of ground stations such as ground station 1874. Furthermore, in an advantageous embodiment aircraft 1802 may be one of a manned aircraft or an unmanned aircraft. In an advantageous embodiment, aircraft 1802 may be a spacecraft such as, for example, a space shuttle or a successor space craft to the space shuttle.

Aircraft 1802 comprises aircraft communication system 1804. Aircraft communication system 1804 comprises internal communication system 1806 and external communication system 1868. Internal communication system 1806 comprises aircraft computing system 1808, electronics bus 1834, and plurality of electronics equipment 1836. Aircraft computing system 1808 comprises aircraft computing system processors 1810, aircraft computing system display 1812, and aircraft computing system storage 1814. Aircraft computing system storage 1814 comprises aircraft applications 1816, table 1818, and aircraft data 1820. Aircraft computing system 1808 further comprises data acquisition unit 1824 and aircraft computing system bus 1822. Data acquisition unit 1824 comprises first communication system devices 1826, third communication system devices 1828, data acquisition unit processors 1830, and data acquisition unit local bus 1832.

An example of a first communication device may be first communication system device 400 in FIG. 4.

As used herein, "third communication system device" means a device associated with an electronics equipment connected to the bus and in which the third communication system device configures the electronics equipment to send and receive a plurality of signals on one of an alternating current (AC) cable and a direct current (DC) cable. An example of a third communication system device may be third communication system device 2130 in FIG. 21. Additional examples of third communication systems devices may be third communication devices 2230 in FIG. 22, third communication device 2530 in FIG. 25, and third communication device 2630 in FIG. 26.

Aircraft computing system bus 1822 connects aircraft computing system processors 1810, aircraft computing system display 1812, aircraft computing system storage 1814 and data acquisition unit 1824.

In an advantageous embodiment, data acquisition unit 1824 may be connected to plurality of electronics equipment 1836 by electronics bus 1834. In an advantageous embodiment, electronics bus 1834 comprises AC cables 1837, DC cables 1835, and pair of wires 390. AC cables 1837 and DC cables 1835 may be any power cables utilized in aircraft 1802 to transmit power from power distribution units 1856 in plurality of electronics equipment 1836.

Plurality of electronics equipment 1836 comprises at least one of a number of unmodified electronics equipment 1838, a number of modified electronics equipment 1846, a number of power distribution units 1856 and a number of independent third communication system devices 1864. Independent third communication system devices 1864 may comprise AC devices 1863 and DC devices 1865.

As used herein, "electronics equipment" may be any electronics equipment configured for connection to a bus. For example, electronics equipment may be configured for connectivity to a bus by having a pair of transmission ports and a pair of receiving ports for connecting to the bus. An example of electronics equipment may be as set forth above in the discussion of FIG. 3. In an embodiment, electronics equipment further may be any equipment configured for connectivity and communication over a bus comprising a number of power lines. As used herein, a "power line" is any wire, cable, conductor, or medium configured for transmission of electric power from a power supply to a device that uses or consumes the electric power, and which also may be configured as a line.

As used herein, "unmodified electronics equipment" comprises a number of first communication system devices located within it and connected to the bus. For example, unmodified electronics equipment may include the examples of FIG. 3. In an advantageous embodiment, each unmodified device 1838 comprises a number of first communication system devices 1840, a number of unmodified equipment processors 1842, and an unmodified equipment local bus 1844. In an advantageous embodiment, unmodified equipment local bus 1844 connects first communication system devices 1840 to the number of unmodified equipment processors 1842. First communication system devices 1840 connect unmodified equipment local bus 1844 to electronics bus 1834.

In an advantageous embodiment, modified electronics equipment may be an electronics equipment having a number of third communication system devices, such as third communication system devices 1848, located within it and connected to a bus and to the electronics equipment. Third communication system devices 1848 may comprise AC devices 1847 and DC devices 1849.

In an advantageous embodiment, modified electronics equipment 1846 comprises a number of third communication system devices 1848, a number of alternate modified equipment processors 1852, and alternate modified equipment local bus 1854. In an advantageous embodiment, modified equipment local bus 1854 connects one of third communication system devices 1848 to the number of modified equipment processors 1852. In an advantageous embodiment, one of third communication system devices 1848 connects modified equipment local bus 1854 to electronics bus 1834.

External communication system 1868 comprises external transceiver 1870 and first communication system devices 1872. External transceiver 1870 may be configured to send and receive signals from data acquisition unit 1824, unmodified electronics equipment 1838, modified electronics equipment 1846, and ground station 1874. External transceiver 1870 may be configured by first communication system devices 1872 to communicate through electronics bus 1834 with data acquisition unit 1824, modified electronics equipment 1846, and ground station 1874. Ground station 1874 may comprise ground station communication system 1876. Ground station communication system 1876 may comprise ground station computer system 1878, second communication system devices 1878, ground station storage 1882 and ground station display 1888. Ground station storage 1882 may comprise ground station applications 1884 and received aircraft data 1886.

In the illustrative embodiments and examples, signals may be sent by and to electronics equipment along electronic bus. An example of a signal flow may be provided in FIG. 6. As used herein, "signals" mean electronic pulses that carry information. As used herein, "Information" comprises at least one of data, audio, video, commands, program code and other information.

The illustration of communications environment 1800 in FIG. 18 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Although the different advantageous embodiments have been described with respect to an aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a space station, a satellite, a surface ship, a power plant, a dam, a manufacturing facility, a building, and/or some other suitable object.

Figure 19:
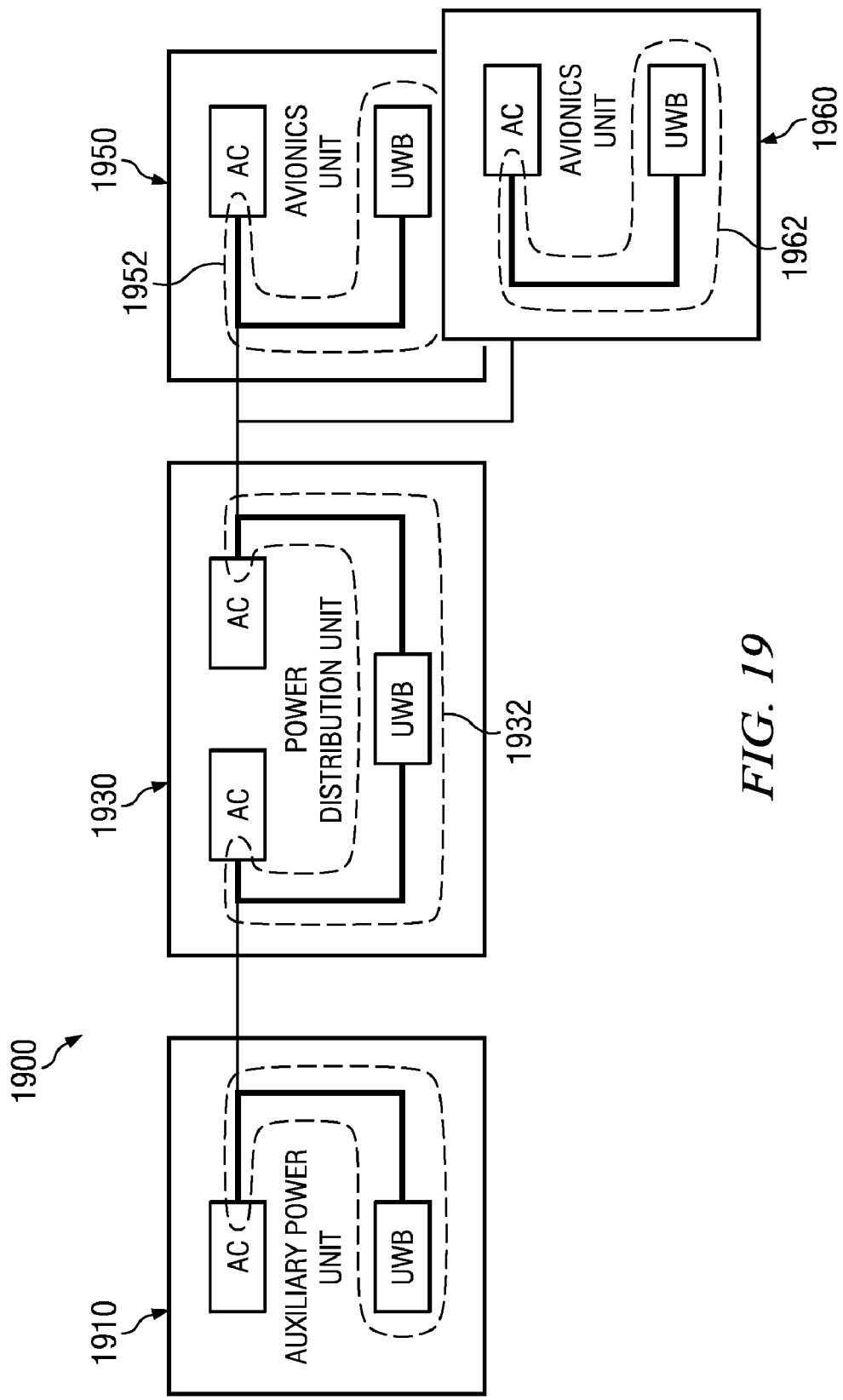
FIG. 19 is an illustration of an AC to AC power distribution device in which an advantageous embodiment may be implemented.

With reference to FIG. 19, an illustration of an AC to AC system is depicted in which an advantageous embodiment may be implemented. The AC to AC system may be a typical baseline aerospace power system configuration enhanced with ultra-wideband communication in accordance with an advantageous embodiment. In the example of FIG. 19, system 1900 comprises power unit 1910 connected to avionics unit 1950 and avionics unit 1960 by power distribution unit 1930. Power unit 1910 may be an alternating current power unit that comprises a third communication device installed. Each of avionics units 1950 and 1960 have a third communication system device 1952 and 1962 connected. Power distribution unit 1930 comprises AC to AC bridge power distribution unit 1930.

Figure 20:
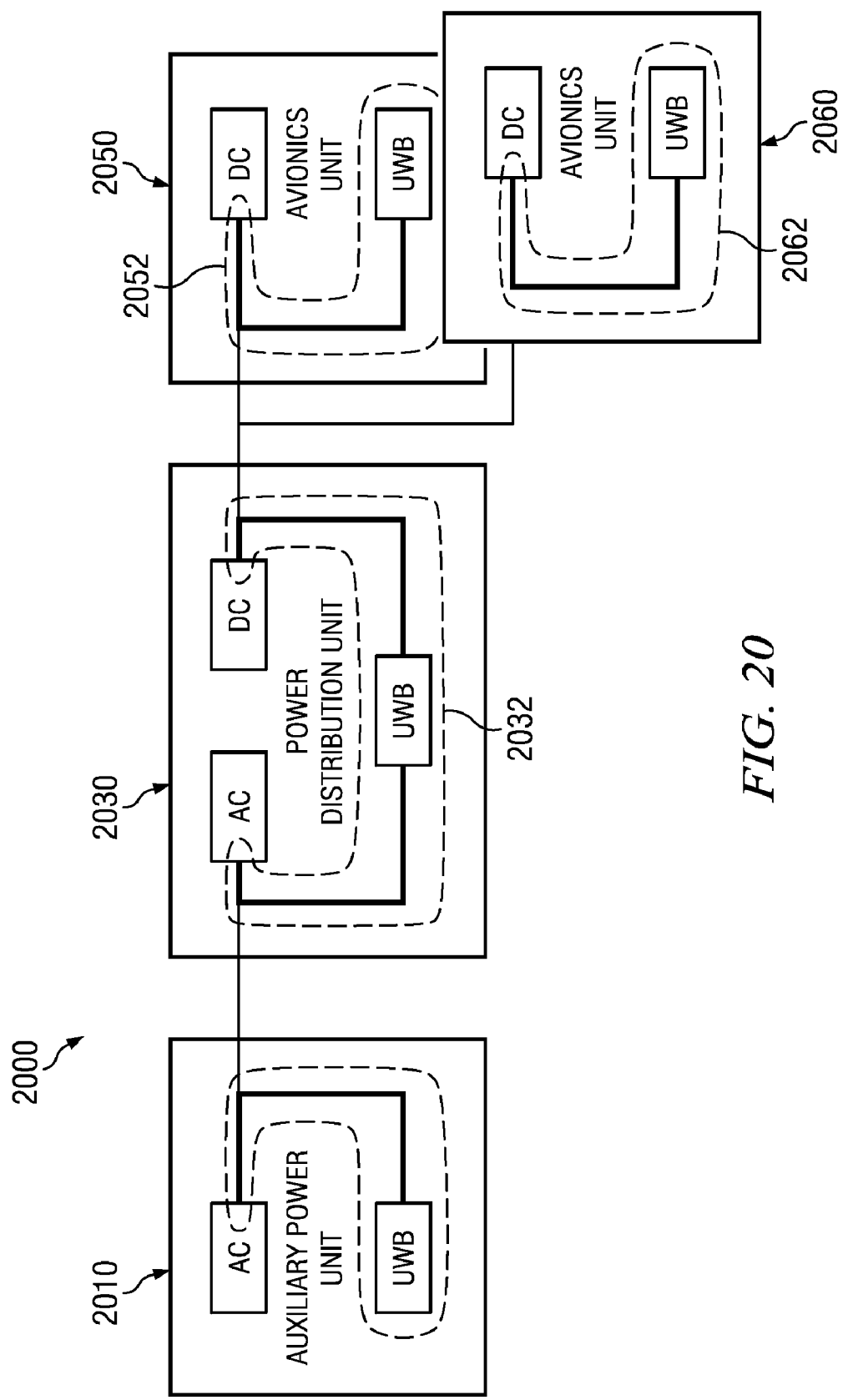
FIG. 20 is an illustration of an AC to DC power distribution device in which an advantageous embodiment may be implemented.

With reference to FIG. 20, an illustration of an AC to DC system in which an advantageous embodiment may be implemented is depicted. The AC to DC system may be a typical baseline aerospace power system configuration enhanced with ultra-wideband communication in accordance with an advantageous embodiment. In the example of FIG. 20, system 2000 comprises auxiliary power unit 2010 connected to avionics unit 2050 and avionics unit 2060 by power distribution unit 2030. Power distribution unit 2030 may be an alternating current power to direct current power unit that comprises an AC to DC bridge unit 2032. Each of avionics units 2050 and 2060 have a third communication system device, 2052 and 2062 respectively, installed. Power distribution unit 2030 has third communication system device 2032 installed.

Figure 21:
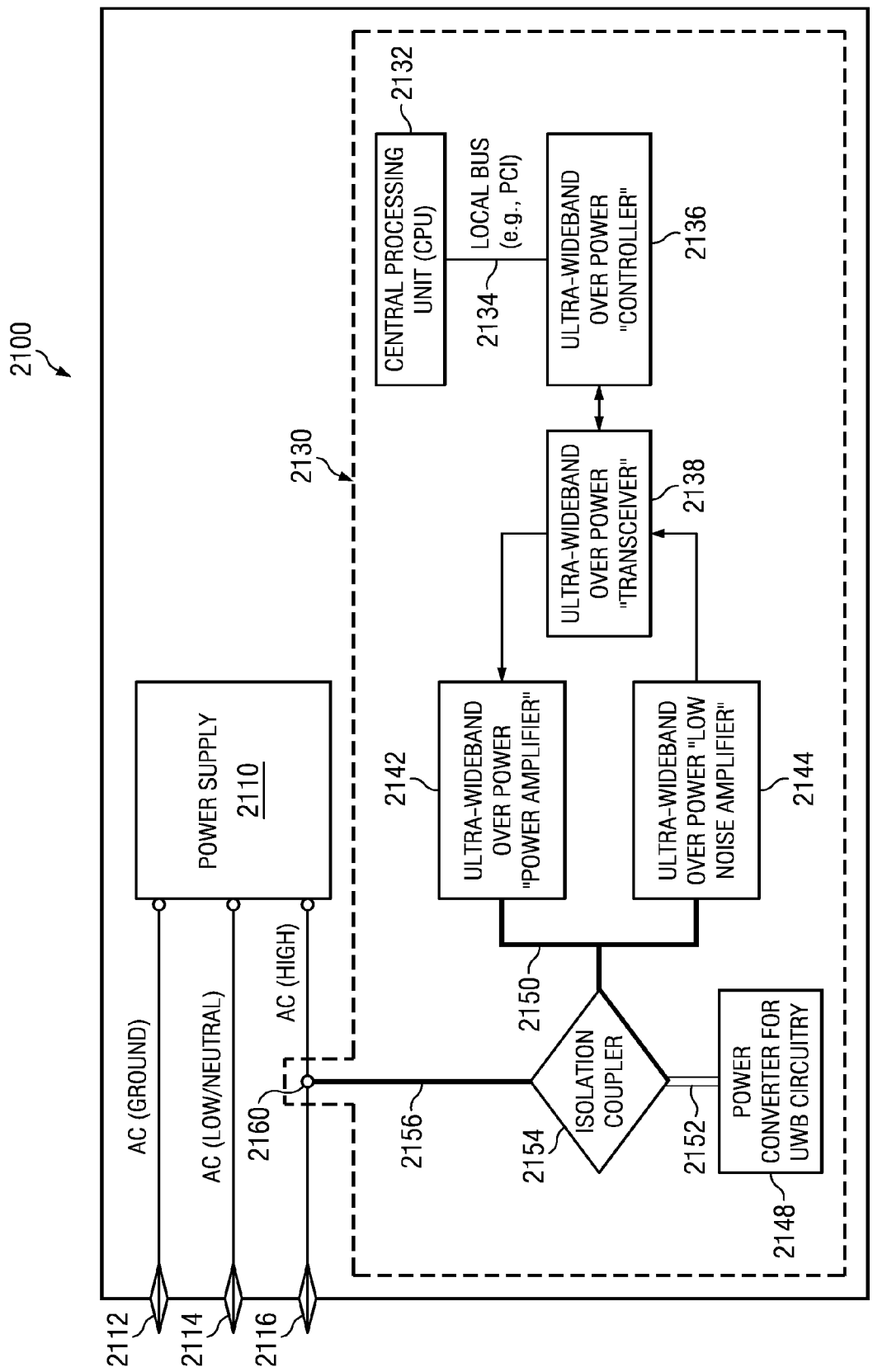
FIG. 21 is an illustration of a third communication system device in which an advantageous embodiment may be implemented.

With reference to FIG. 21, an illustration of a third communication system device is depicted in which an advantageous embodiment may be implemented. In the example of FIG. 21, third communication system device 2130 may be internally connected to power supply 2110. Power supply 2110 comprises AC ground wire 2112, AC low/neutral wire 2114, and AC high voltage wire 2116. Third communication system device 2130 comprises central processing unit 2132, local bus 2134, ultra-wideband over power controller 2136, ultra-wideband over power transceiver 2138, ultra wideband over power power amplifier 2142 and ultra-wideband over power low noise amplifier 2144. Ultra-wideband over power amplifier and ultra wideband over power low noise amplifier may be connected by line 2150 to isolation coupler 2154. Isolation coupler 2154 may be connected to power converter 2148 by line 2152. Isolation coupler 2154 may be connected to AC high voltage wire 2116 of power supply 2110 at connection 2160 by wire 2156.

Figure 22:
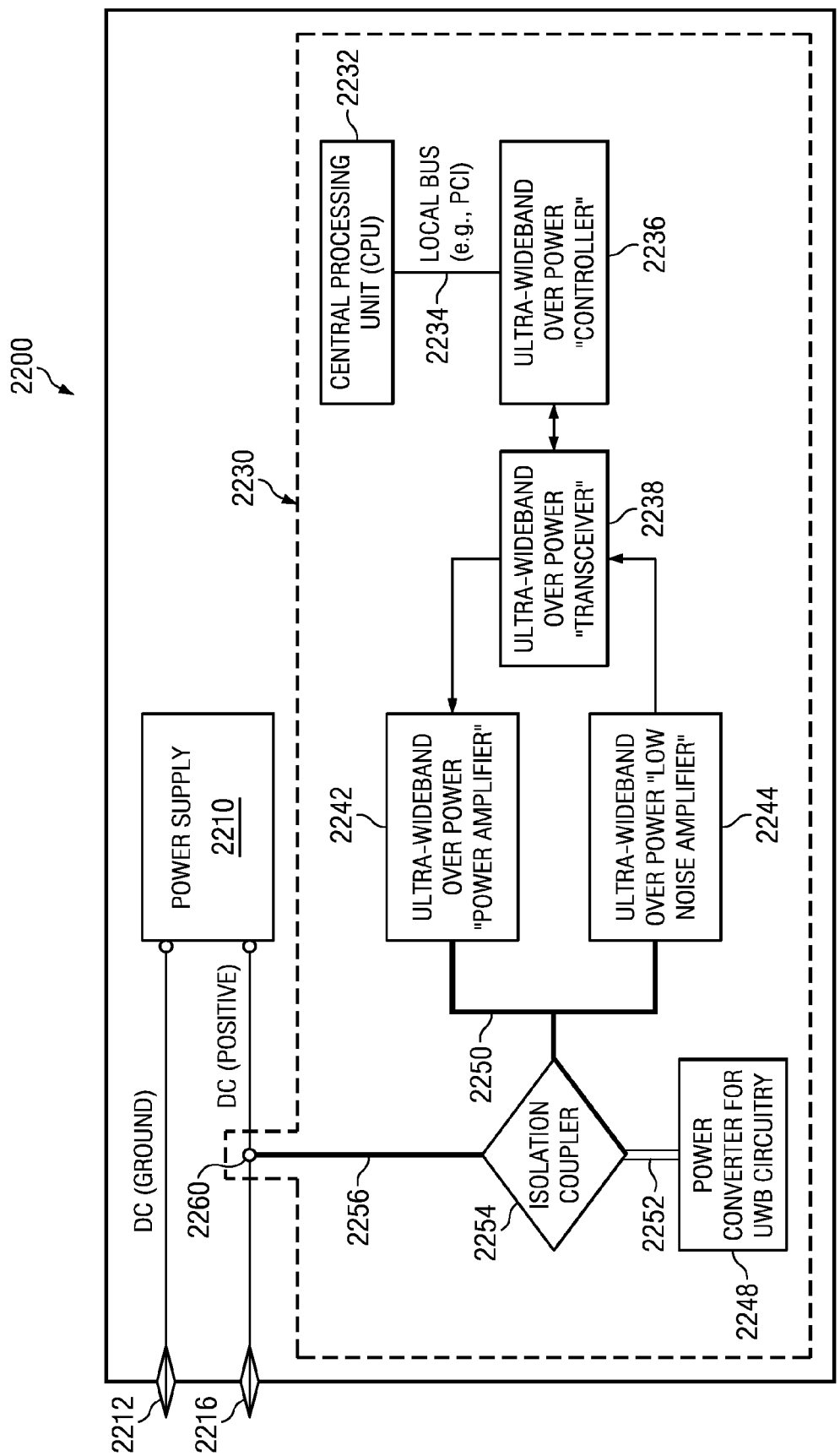
FIG. 22 is an illustration of a third communication system device in which an advantageous embodiment may be implemented.

With reference now to FIG. 22, an illustration of a third communication system device is depicted in which an advantageous embodiment may be implemented. In the example of FIG. 22, third communication system device 2230 may be internally connected to power supply 2210. Power supply 2210 comprises DC ground wire 2212 and DC positive wire 2216. Third communication system device 2230 comprises central processing unit 2232, local bus 2234, ultra-wideband over power controller 2236, ultra-wideband over power transceiver 2238, ultra wideband over power power amplifier 2240 and ultra-wideband over power low noise amplifier 2244. Ultra-wideband power amplifier 2242 and ultra wideband low noise amplifier 2244 may be connected by line 2250 to isolation coupler 2254. Isolation coupler 2254 may be connected to power converter 2248 by line 2252. Isolation coupler 2254 connects to DC positive wire 2216 of power supply 2210 at connection 2260 by wire 2256.

Figure 23:
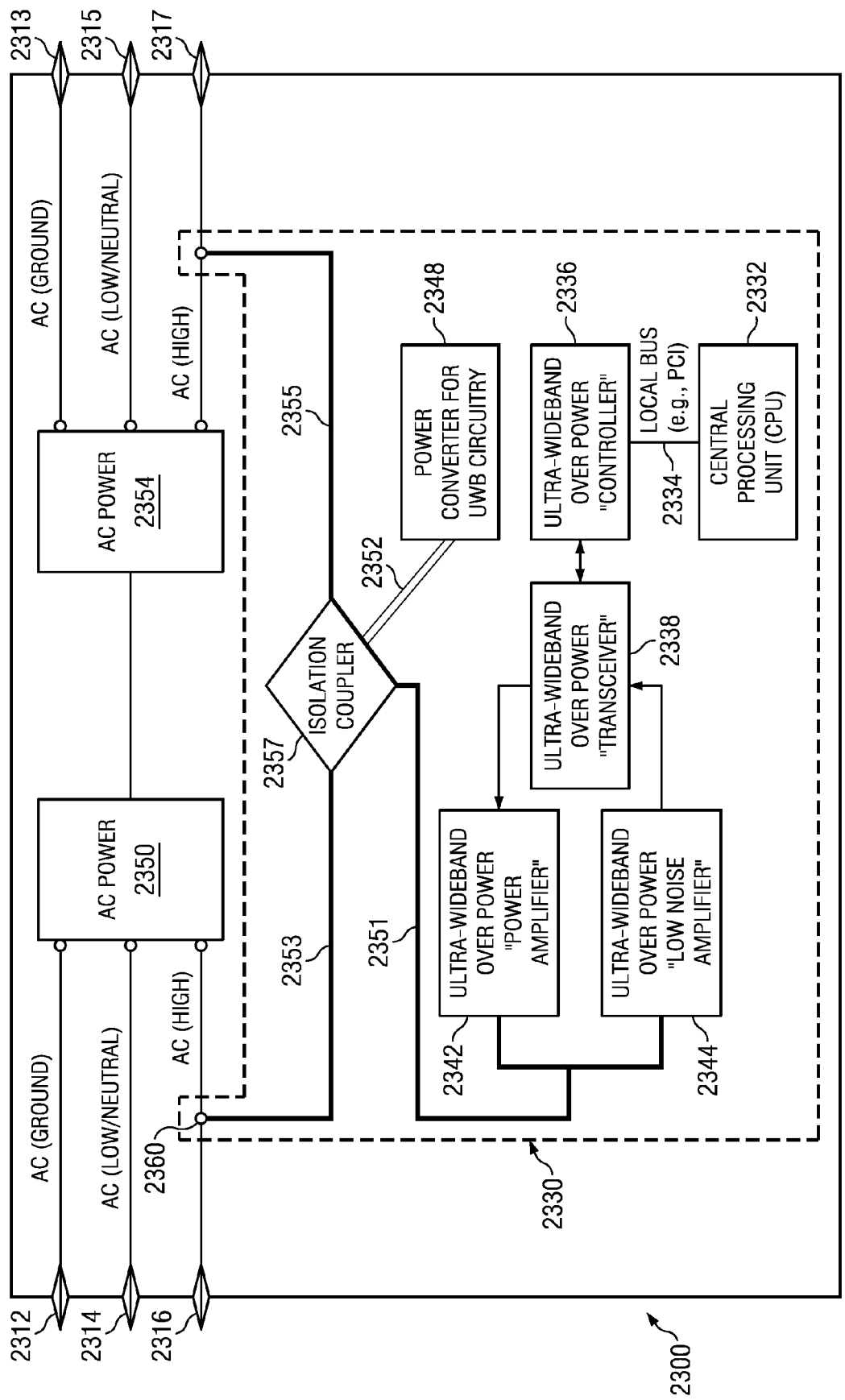
FIG. 23 is an illustration of a AC to AC bridge device in which an advantageous embodiment may be implemented.

With reference now to FIG. 23, an illustration of a AC to AC bridge device is depicted in which an advantageous embodiment may be implemented. In the example of FIG. 23, third communication system device 2330 may be internally connected to AC power supply 2350 and to AC power supply 2354 by isolation coupler 2355. AC Power supply 2350 comprises AC ground wire 2312, AC low/neutral wire 2314, and AC high voltage wire 2316. AC power supply 2354 comprises AC ground wire 2313, AC low/neutral wire 2315, and AC high voltage wire 2317. Isolation coupler 2357 may be connected to AC high voltage wire 2316 by line 2353 at connection 2360. Isolation coupler 2357 may be connected to AC high voltage wire 2317 at connection 2361 by line 2355. Third communication system device 2330 comprises central processing unit 2332, local bus 2334, ultra-wideband over power controller 2336, ultra-wideband over power transceiver 2338, ultra wideband over power power amplifier 2342 and ultra-wideband over power low noise amplifier 2344. Ultra-wideband over power power amplifier 2342 and ultra wideband over power low noise amplifier 2344 may be connected by bus 2351 to isolation coupler 2357. Isolation coupler 2357 may be connected to power converter 2348 by line 2352.

Figure 24:
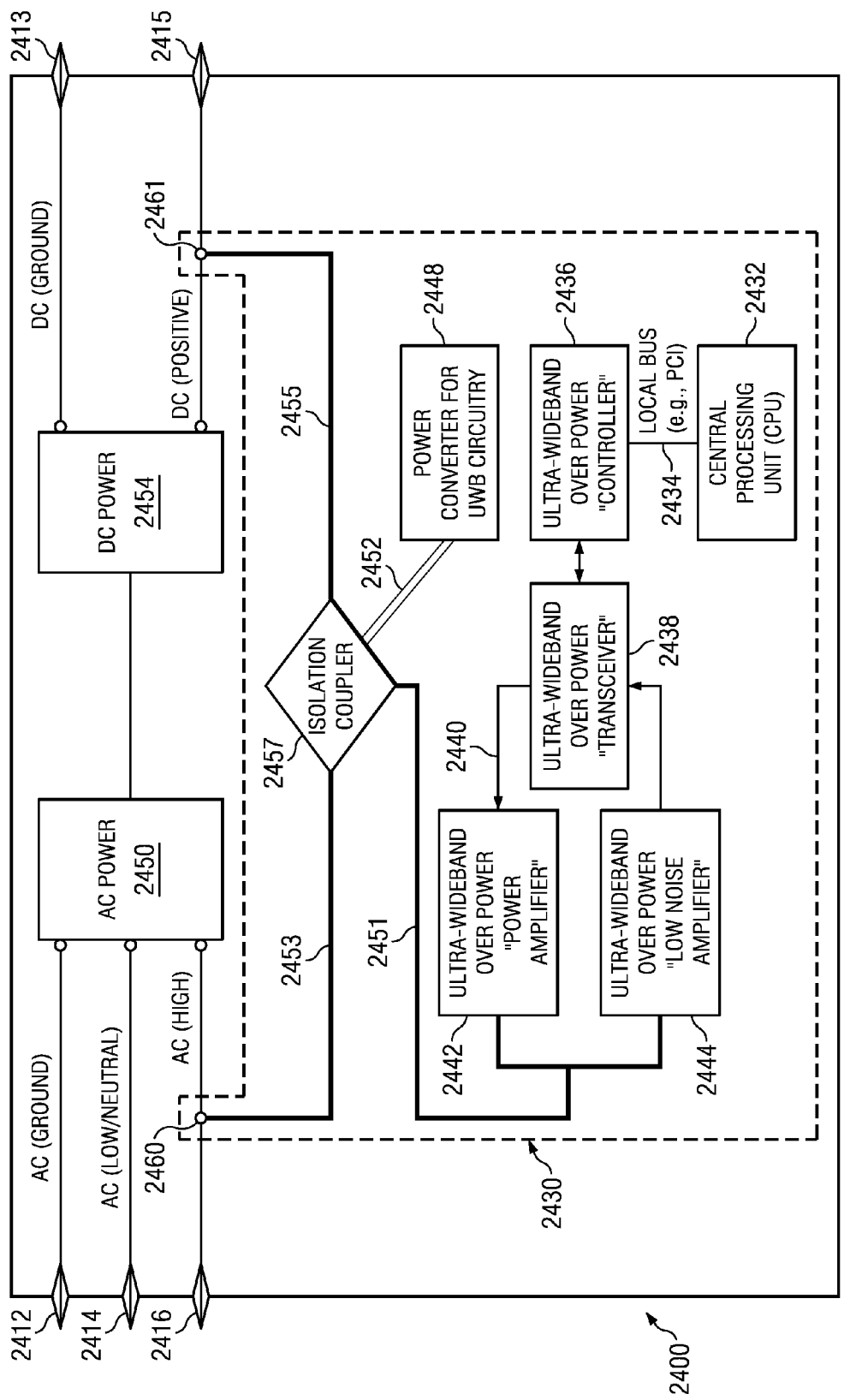
FIG. 24 is an illustration of an AC to DC bridge device in which an advantageous embodiment may be implemented.

With reference now to FIG. 24, an illustration of an AC to DC bridge device is depicted in which an advantageous embodiment may be implemented. In the example of FIG. 24, third communication system device 2430 may be internally connected to AC power supply 2450 and to DC power supply 2454 by isolation coupler 2457. AC Power supply 2450 comprises AC ground wire 2412, AC low/neutral wire 2414, and AC high voltage wire 2416. DC power supply 2454 comprises DC ground wire 2413 and DC positive wire 2415. Isolation coupler 2457 may be connected to AC high voltage wire 2416 by line 2453 at connection 2460. Isolation coupler 2457 may be connected to DC positive wire 2415 at connection 2461 by line 2455. Third communication system device 2430 comprises central processing unit 2432, local bus 2434, ultra-wideband over power controller 2436, ultra-wideband over power transceiver 2438, ultra wideband over power power amplifier 2442 and ultra-wideband over power low noise amplifier 2444. Ultra-wideband over power power amplifier 2442 and ultra wideband over power low noise amplifier 2444 may be connected by line 2450 to isolation coupler 2457. Isolation coupler 2457 may be connected to power converter 2448 by line 2452.

Figure 25:
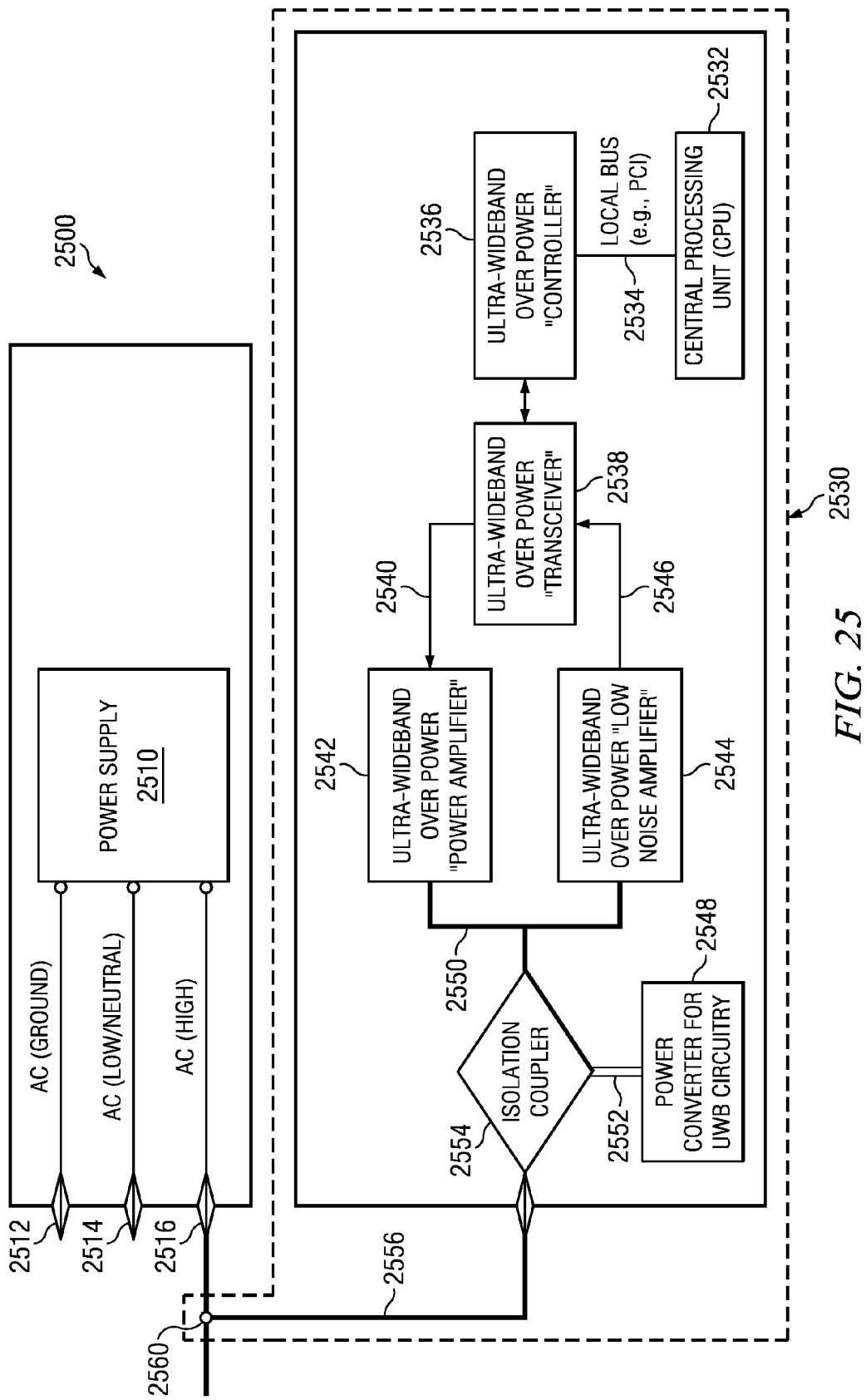
FIG. 25 is an illustration of a third communication system device in which an advantageous embodiment may be implemented.

With reference now to FIG. 25, an illustration of a third communication system device is depicted in which an advantageous embodiment may be implemented. In the example of FIG. 25, third communication system device 2530 may be externally connected to power supply 2510. Power supply 2510 comprises AC ground wire 2512, AC low voltage/neutral wire 2514, and AC high voltage wire 2516. Third communication system device 2530 comprises central processing unit 2532, local bus 2534, ultra-wideband over power controller 2536, ultra-wideband transceiver 2538, ultra wideband power amplifier 2540 and ultra-wideband low noise amplifier 2544. Ultra-wideband over power power amplifier 2542 and ultra wideband over power low noise amplifier 2544 may be connected by bus 2550 to isolation coupler 2554. Isolation coupler 2554 may be connected to power converter 2548 by line 2552. Isolation coupler 2554 connects to AC high voltage wire 2516 of power supply 2510 at connection 2560 by wire 2556.

Figure 26:
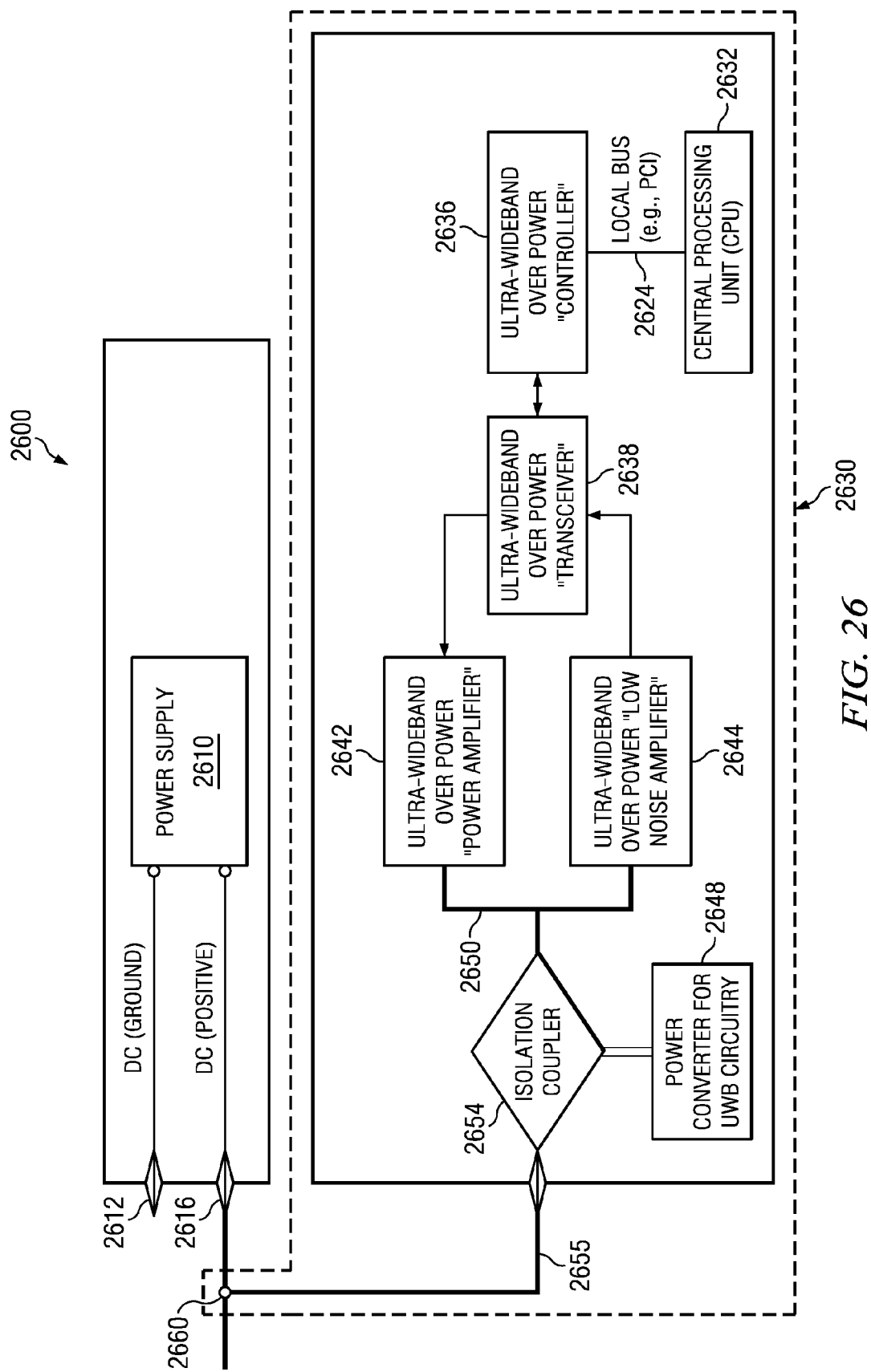
FIG. 26 is an illustration of a third communication system device in which an advantageous embodiment may be implemented.

With reference now to FIG. 26, an illustration of a third communication system device is depicted in which an advantageous embodiment may be implemented. In the example of FIG. 26, third communication system device 2630 may be externally connected to power supply 2610. Power supply 2610 comprises DC ground wire 2612 and DC positive wire 2616. Third communication system device 2630 comprises central processing unit 2632, local bus 2624, ultra-wideband over power controller 2636, ultra-wideband over power transceiver 2638, ultra wideband over power power amplifier 2642 and ultra-wideband over power low noise amplifier 2644. Ultra-wideband over power power amplifier 2642 and ultra wideband over power low noise amplifier 2644 may be connected by bus 2650 to isolation coupler 2654. Isolation coupler 2654 may be connected to power converter 2648. Isolation coupler 2654 connects to DC positive wire 2616 of power supply 2610 at connection 2660 by wire 2655.

Figure 27:
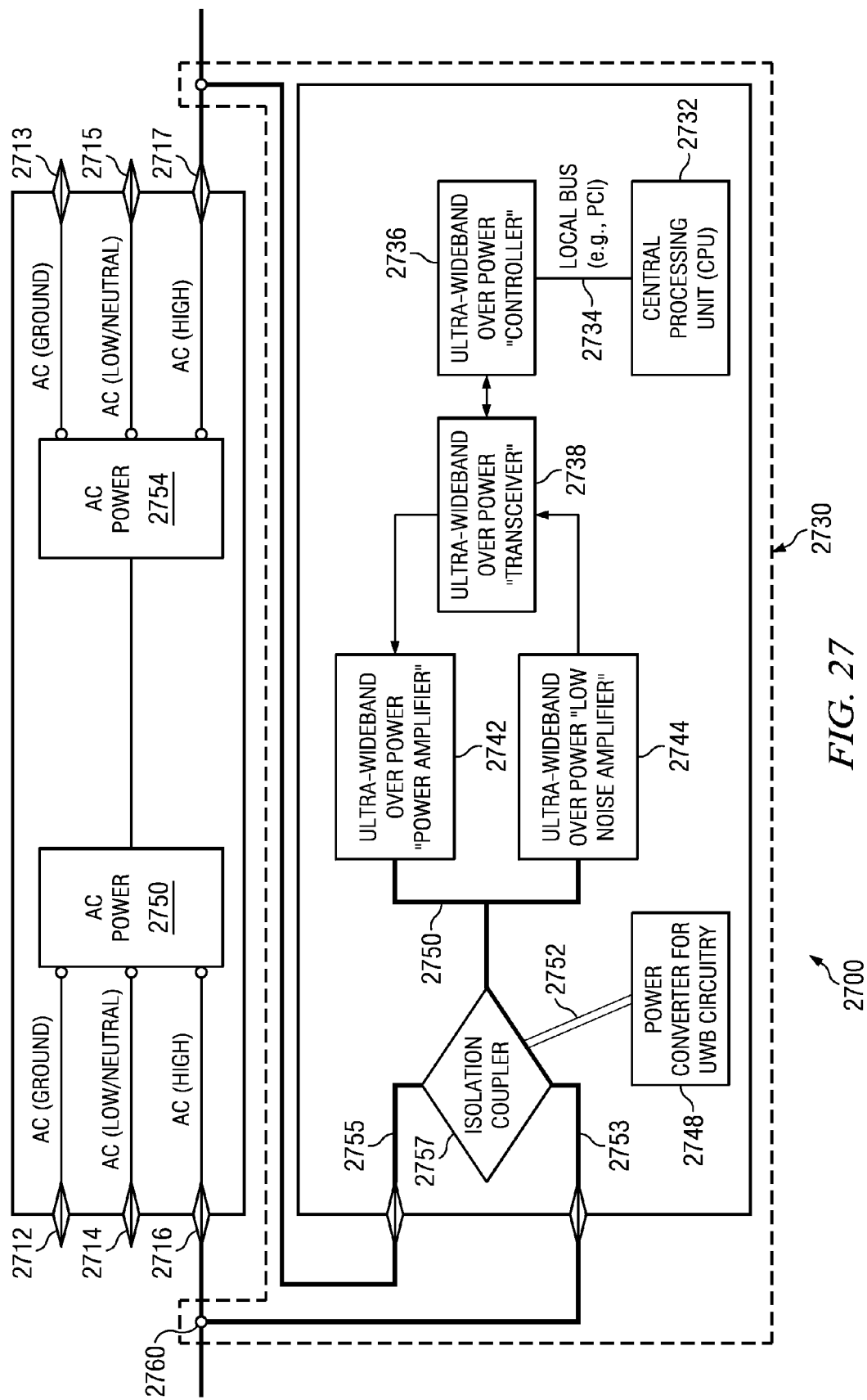
FIG. 27 is an illustration of a AC to AC bridge device in which an advantageous embodiment may be implemented.

With reference now to FIG. 27, an illustration of AC to AC bridge device 2700 is depicted in which an advantageous embodiment may be implemented. In the example of FIG. 27, third communication system device 2730 may be externally connected to AC power supply 2750 and to AC power supply 2754 by isolation coupler 2757. AC Power supply 2750 comprises AC ground wire 2712, AC low voltage/neutral wire 2714, and AC high voltage wire 2716. AC power supply 2754 comprises AC ground wire 2713, AC low/neutral wire 2715, and AC high voltage wire 2717. Isolation coupler 2757 may be connected to AC high voltage wire 2716 by line 2753 at connection 2760. Isolation coupler 2757 may be connected to AC high voltage wire 2717 at connection 2762 by line 2755. Third communication system device 2730 comprises central processing unit 2732, local bus 2734, ultra-wideband over power controller 2736, ultra-wideband over power transceiver 2738, ultra wideband over power power amplifier 2742 and ultra-wideband over power low noise amplifier 2744. Ultra-wideband over power power amplifier 2742 and ultra wideband over power low noise amplifier 2744 may be connected by bus 2750 to isolation coupler 2757. Isolation coupler 2757 may be connected to power converter 2748 by line 2752.

Figure 28:
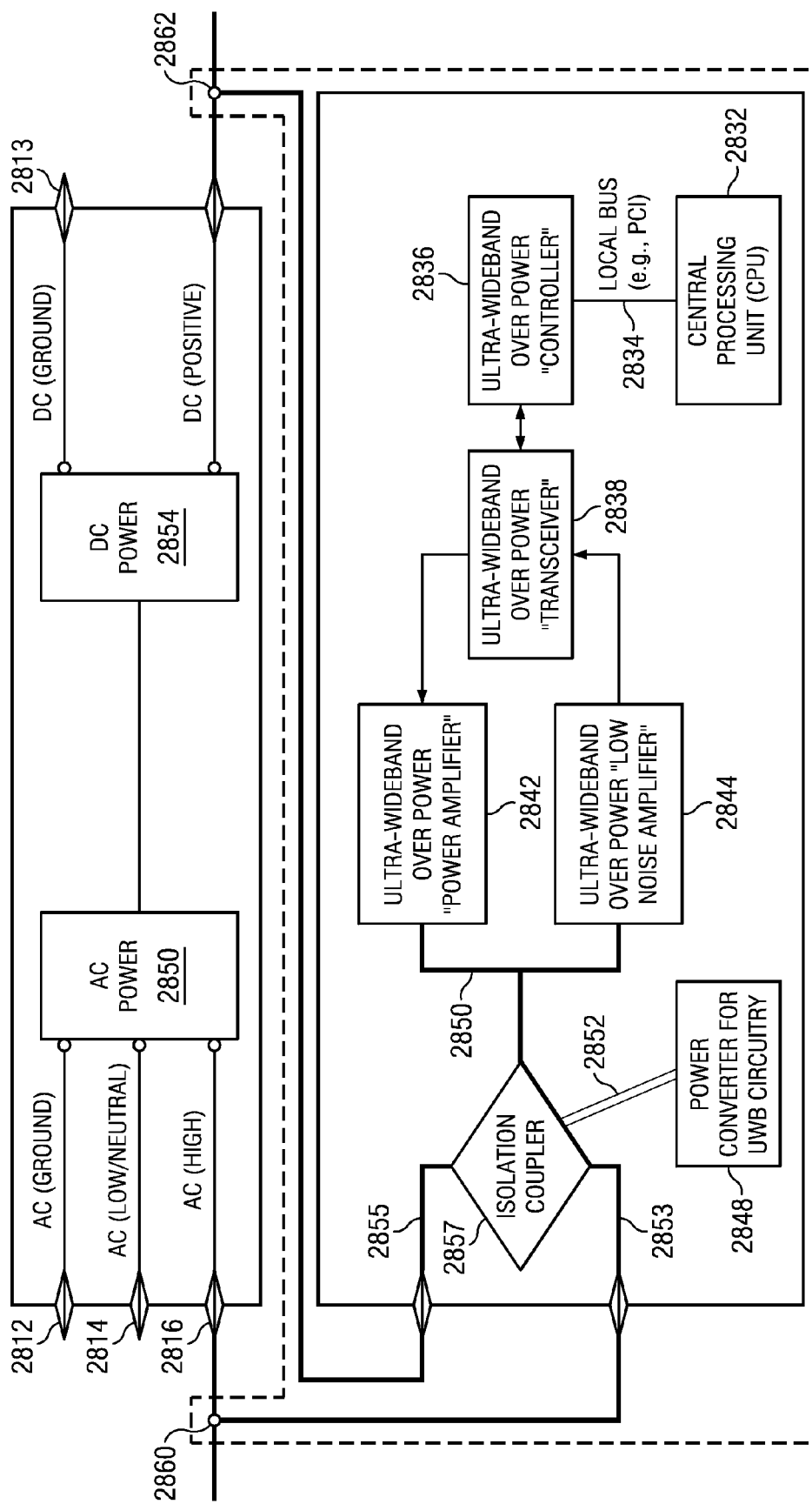
FIG. 28 is an illustration of an AC to DC bridge device in which an advantageous embodiment may be implemented.

With reference now to FIG. 28, an illustration of AC to DC bridge device 2800 is depicted in which an advantageous embodiment may be implemented. In the example of FIG. 28, third communication system device 2830 may be internally connected to AC power supply 2850 and to DC power supply 2854 by isolation coupler 2857. AC Power supply 2850 comprises AC ground wire 2812, AC low voltage/neutral wire 2814, and AC high voltage wire 2816. DC power supply 2854 comprises DC ground wire 2813 and DC positive wire 2815. Isolation coupler 2857 may be connected to AC high voltage wire 2816 by line 2853 at connection 2860. Isolation coupler 2857 may be connected to DC positive wire 2817 at connection 2862 by line 2855. Third communication system device 2830 comprises central processing unit 2832, local bus 2834, ultra-wideband over power controller 2836, ultra-wideband over power transceiver 2838, ultra over power wideband power amplifier 2842 and ultra-wideband over power low noise amplifier 2844. Ultra-wideband power amplifier 2842 and ultra wideband low noise amplifier 2844 may be connected by bus 2850 to isolation coupler 2854. Isolation coupler 2854 may be connected to power converter 2848 by line 2852.

Figure 29:
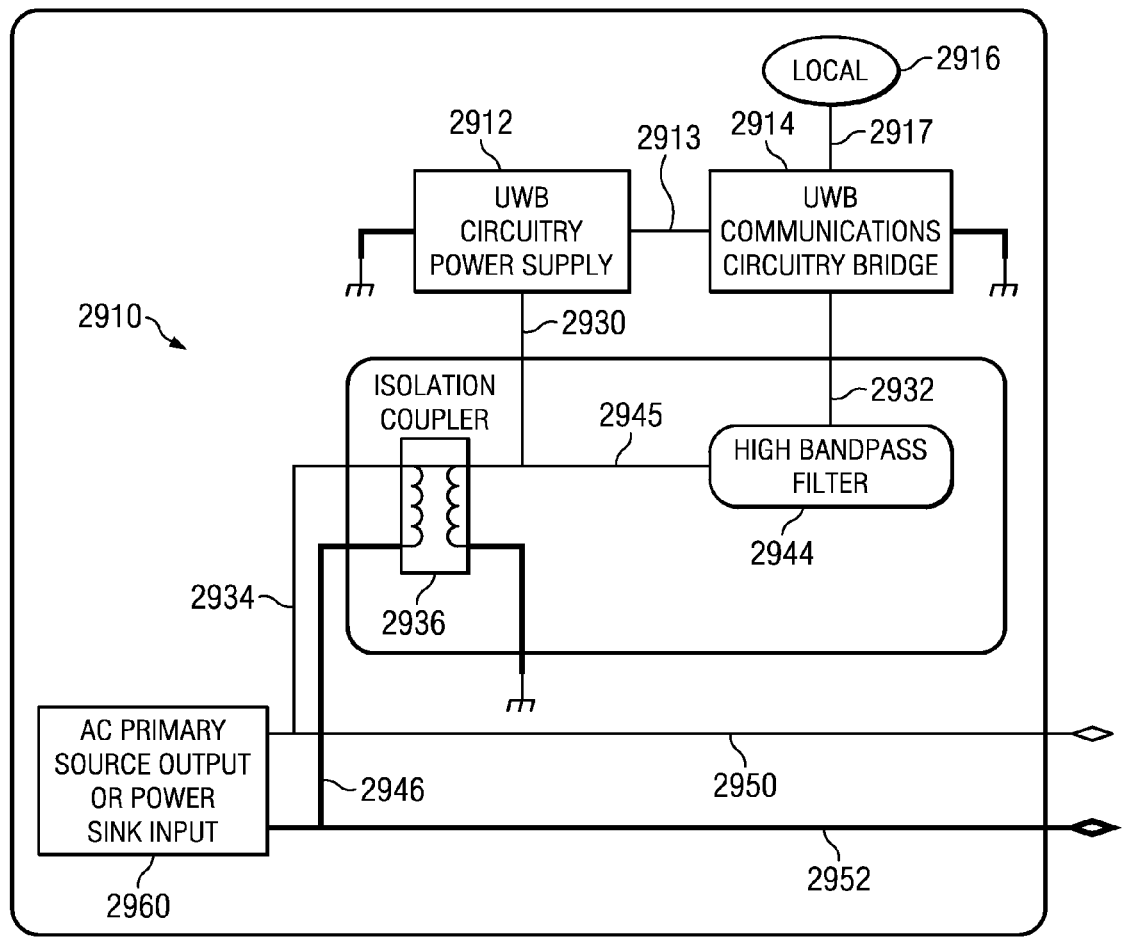
FIG. 29 is an illustration of a third communication device in which an advantageous embodiment may be implemented.

With reference now to FIG. 29, an illustration of a third communication device may be depicted in which an advantageous embodiment may be implemented. Power supply 2912 may be connected to bridge 2914 by line 2913 and to isolation coupler 2936 by line 2930. Bridge 2914 may be connected to power supply 2912 by lines 2913 and to high bandpass filter 2944 by line 2932. Bridge 2914 may be connected to local bus 2916 by line 2917. High bandpass filter 2944 may be connected to isolation coupler 2936 by line 2945. Isolation coupler 2936 may be connected to AC primary Source 2960 by line 2934.

Figure 30:
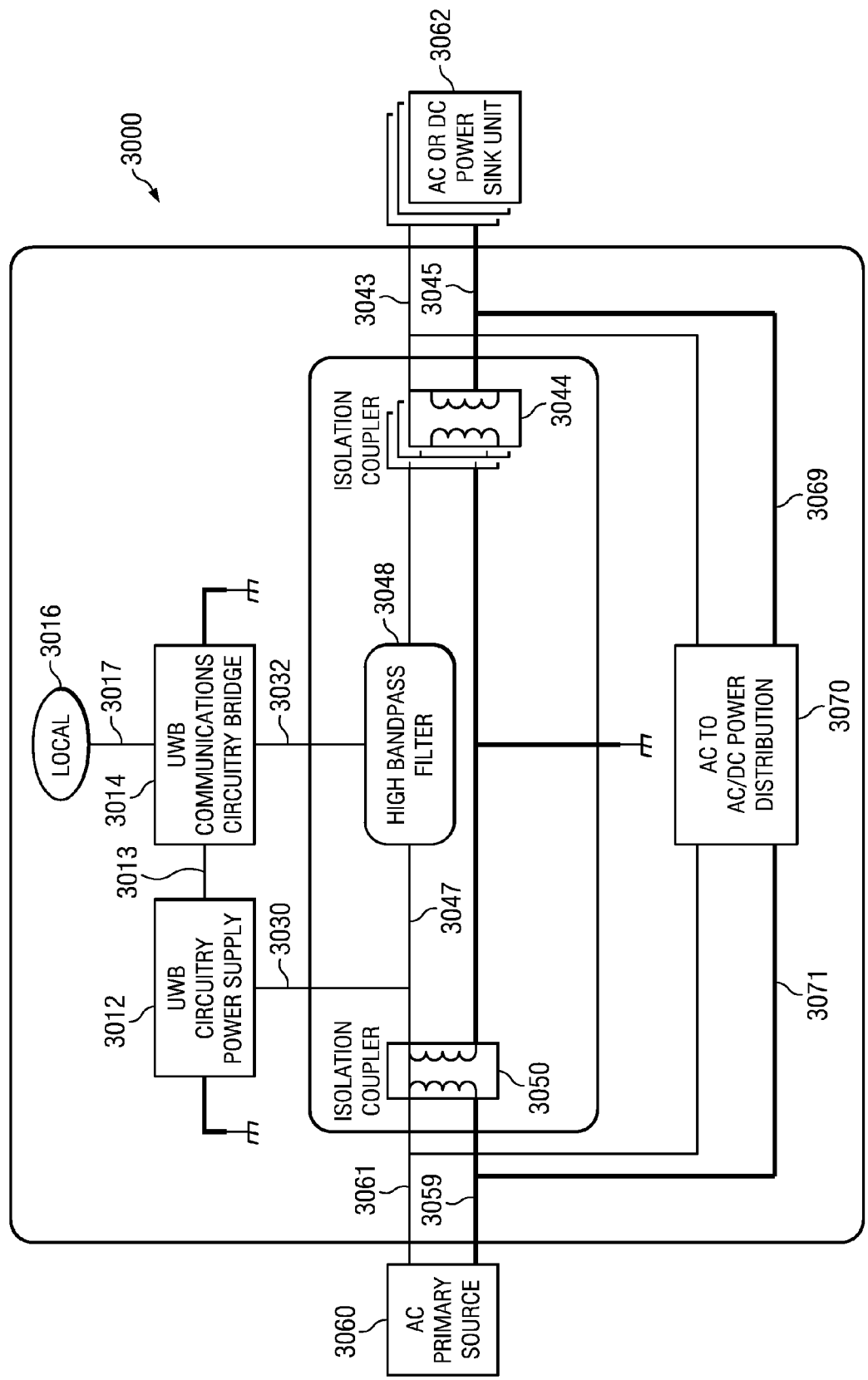
FIG. 30 is an illustration of an AC to AC or DC bridge device in which an advantageous embodiment may be implemented.

With reference now to FIG. 30, an illustration of AC to AC or DC bridge device 3000 is depicted in which an advantageous embodiment may be implemented. Power supply 3012 may be connected to bridge 3014 by line 3013 and to isolation coupler 3050 by line 3030. Bridge 3014 may be connected to power supply 3012 by lines 3013 and to high bandpass filter 3048 by line 3032. Bridge 3014 may be connected to local bus 3016 by line 3017. High bandpass filter 3048 may be connected to isolation coupler 3050 by line 3047. Isolation coupler 3050 may be connected to AC primary source 3060 by line 3061 and by line 3059. Isolation coupler 3044 may be connected to AC or DC power sink unit 3062 by line 3043 and line 3045. AC to AC/DC power distribution unit 3070 may be connected to line 3059 by line 3071 and to AC or DC power sink unit 3062 by line 3069.

Figure 31:
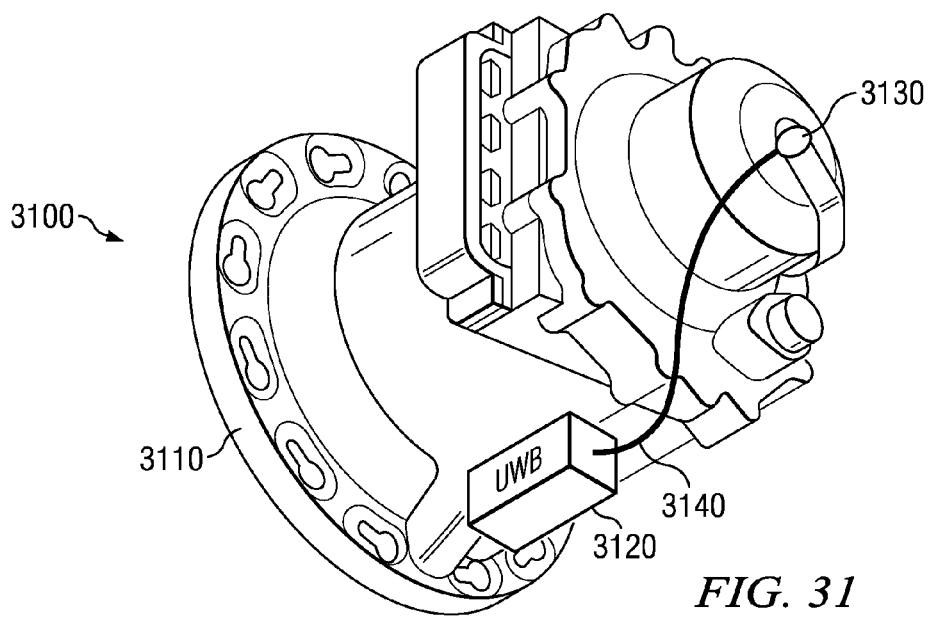
FIG. 31 is an illustration of an auxiliary power unit with a third communications device attached in which an advantageous embodiment may be implemented.

With reference now to FIG. 31, an illustration of auxiliary power unit generator with a third communication system device attached 3100 is depicted in which an advantageous embodiment may be implemented. Third communication system device 3120 is connected by line 3140 to output 3130 of auxiliary power unit generator 3110.

Figure 32:
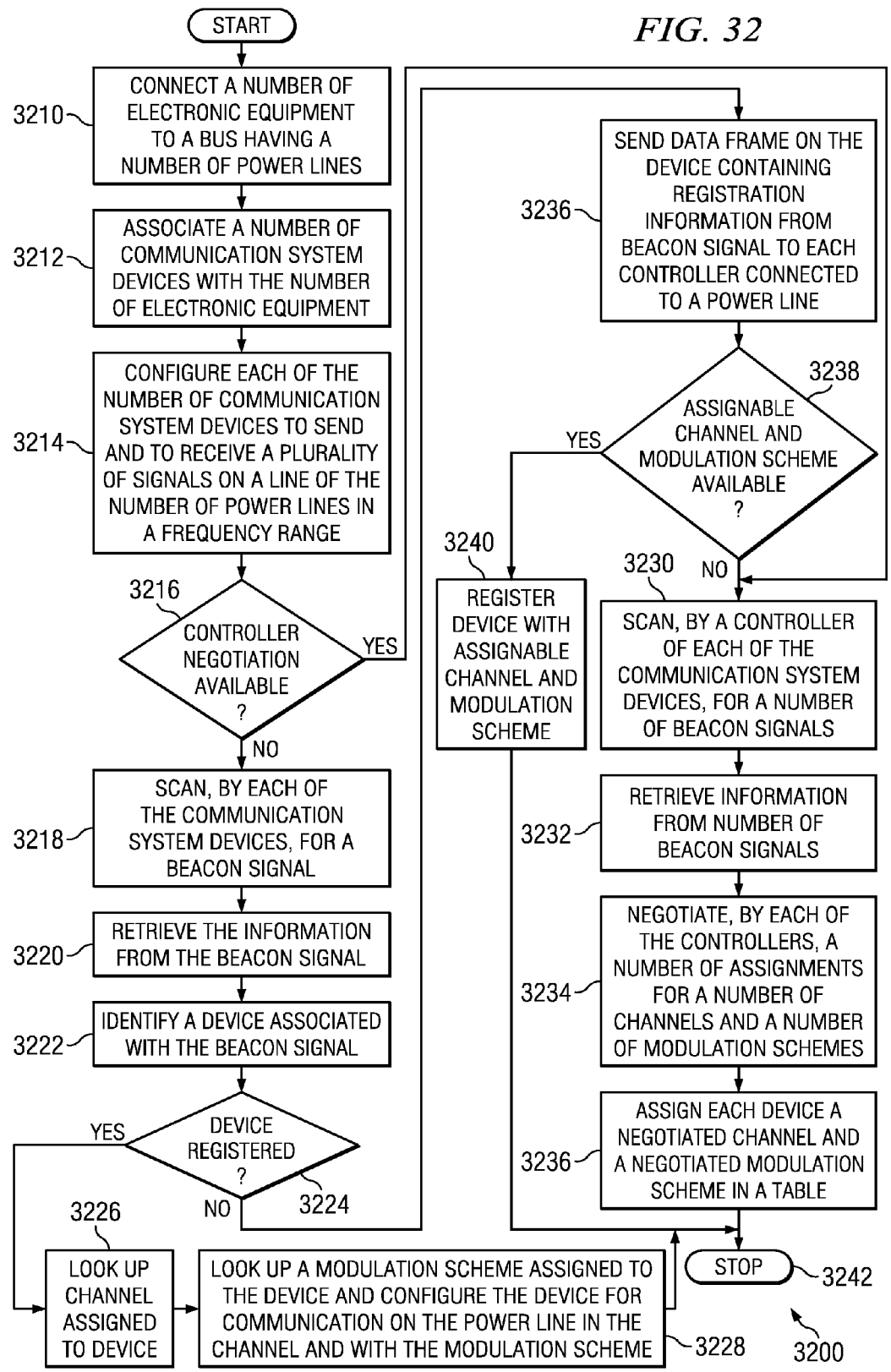
FIG. 32 is a flowchart of a process for sending a signal on a communication system device in an advantageous embodiment is implemented.

With reference now to FIG. 32, an illustration of a flowchart of a process in which sending a signal on a communication system device is depicted in which an advantageous embodiment is implemented. In the example of FIG. 32, the communication system device is a third communication system device such as third communication system devices 1828 and 1848 in FIG. 18. In an advantageous embodiment, the communication system device may be an independent third communication system device such as in independent third communication systems devices 1864 of FIG. 18. Process 3200 starts and connects a number of electronics equipment to a bus having a number of power lines (operation 3210). In an advantageous embodiment, power lines may be one of AC cables 1837 and DC cables 1835 in FIG. 18. Process 3200 associates a number of communication system devices with the number of electronics equipment (operation 3212) and configures each of the number of communication system devices to send and to receive a plurality of signals on a line of the number of power lines in a frequency range (operation 3214). Process 3200 determines whether controller negotiation is available (operation 3216). Responsive to determining that controller negotiation is not available, process 3200 scans, by each of the communication system devices, for a beacon signal (operation 3218), retrieves the information from the beacon signal (operation 3220), and identifies a device associated with the beacon signal (operation 3222).

If at operation 3216, process 3200 determines that controller negotiation is not available, process 3200 determines whether the device is registered (operation 3224). If the device is registered, process 3200 looks up a channel assigned to the device (operation 3226), looks up a modulation scheme assigned to the device, and configures the device for communication on the power line in the channel and with the modulation scheme (operation 3228).

If at operation 3216 process 3200 determines that controller negotiation is available, process 3200 scans, by a controller of each of the communication system devices, for a number of beacon signals (operation 3230). Responsive to acquiring, by each of the number of controllers, the number of beacon signals, process 3200 retrieves the information from the number of beacon signals (3232). Responsive to retrieving the information, process 3200 negotiates, by each of the controllers, a number of assignments for a number of channels and a number of modulation schemes (operation 3234), and responsive to negotiating the number of channels and the number of modulations schemes, assigns each device a negotiated channel and a negotiated modulation scheme in a table (operation 3236).

If at operation 3224, process 3200 determines that the device is not registered, process 3200 sends a data frame of the device containing registration information from the beacon signal to each controller connected to a power line (operation 3236). Process 3200 determines whether an assignable channel and modulation scheme is available (operation 3238). If an assignable channel and modulation scheme is available, process 3200 registers the device with the assignable channel and modulation scheme (operation 3240). If at operation 3238, an assignable channel and modulation scheme are not available, process 3200 returns to operation 3230.

After operations 3230, 3236, and 3240, process 3200 stops (operation 3242).

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a bus network having a set of lines;
   a number of second communication system devices associated with a number of electronics equipment connected to the bus network in which each second communication system device configures the electronics equipment to send and receive a plurality of signals on a line of the set of lines in a second frequency range masked from a number of first communication devices in each of the number of electronics equipment operating in a first frequency range on the bus network, wherein each of the first communication devices is configured for unidirectional communication in the first frequency range on the bus network, and wherein each second communication system device is configured for bi-directional communication in a second frequency range on each of the set of lines and wherein.

2. The apparatus of claim 1 further comprising:
a first communication device located in each of the number of electronics equipment having a transmitter and a receiver, in which the transmitter is configured for unidirectional transmission on one line of the set of lines in the first frequency range and in which the receiver is configured for unidirectional reception on another line of the set of lines in the first frequency range.

3. The apparatus of claim 1 in which each of the number of second communication devices comprise a controller and a transceiver.

4. The apparatus of claim 3 in which each of the number of second communication devices further comprise:
a first amplifier connected to each of the number of second communication system devices and configured to amplify a signal in the second frequency range to a level required by the transceiver for receipt of the signal; and
a second amplifier configured to transmit a signal generated by the transceiver in the second frequency range, the amplitude and second frequency range being within a noise region masked from the plurality of first communication system devices in the plurality of electronics equipment and in the data acquisition unit.

5. The apparatus of claim 1 in which each of the first plurality of second communication system devices is located in a particular electronics equipment and is connected to a central processing unit of the particular electronics equipment by a local bus located in the particular electronics equipment.

6. The apparatus of claim 1 in which each of the first plurality of second communication system devices is located in each of the number of electronics equipment without any change in a size and a connectivity to the bus network of any of the number of electronics equipment.

7. The apparatus of claim 3 in which the transceiver is configured to avoid the first frequency range and to identify a particular electronics equipment and a number of capabilities of the particular electronics equipment to which the transceiver is associated by a particular second communication system device in which the transceiver is located.

8. The apparatus of claim 7 in which the controller is configured to direct the transceiver to select a particular portion of the second frequency range for sending or receiving a number of signals.

9. The apparatus of claim 8 in which the transceiver is directed by the controller to employ one or more of a plurality of modulation schemes to divide the second frequency range into a plurality of sub-ranges.

10. The apparatus of claim 9 in which the controller is further configured to direct the transceiver to select a sub-range from the plurality of sub-ranges for sending or receiving the number of signals.

11. The apparatus of claim 1 further comprising:
an additional second communication system device connected to a computer in a network external to the bus network so that the computer can send signals to and receive signals from each of the plurality of electronics equipment connected to the bus network.

12. The apparatus of claim 11 in which the computer is connected to a storage containing a table assigning a number of portions of the second frequency range to each of the plurality of electronics equipment.

13. The apparatus of claim 11 in which the computer is connected to a storage containing a plurality of instructions, the plurality of instructions configured to direct a processor of the computer to determine a particular portion of the frequency range to be assigned to each of the plurality of electronics equipment connected to the bus network.

14. The apparatus of claim 1 in which two second communication devices are located in an electronics equipment and in which one of the two second communication devices is connected to a first line of the set of lines and the other second communication device is connected to a second line of the set of lines.

15. The apparatus of claim 14 further comprising:
a connection between each of the two second communication system devices and a central processing unit of the electronics equipment;
a transceiver in each of the two second communication system devices configured to avoid the first frequency range, to identify the electronics equipment and a plurality of capabilities of the electronics equipment to which each of the two second communication devices are connected, and to employ one or more of a plurality of modulation schemes to divide a portion of the second frequency range into a plurality of sub-portions; and
a controller configured to direct the transceiver to select a portion of the second frequency range from a table associating the electronics equipment to the portion and further to direct the transceiver to select a sub-portion of the portion of the second frequency range from the plurality of sub-portions for sending or receiving the number of signals.

16. The apparatus of claim 15 further comprising:
an independent second communication system device connected to a computer in a network external to the bus network so that the computer can send and receive the number of signals to each of the number of electronics equipment connected to the bus network, the computer connected to a storage containing the table and in which the storage further contains a plurality of instructions, the plurality of instructions configured to direct a processor of the computer to determine a particular portion or sub-portion of the second frequency range to be assigned to each of the number of electronics equipment connected to the bus network.

17. The apparatus of claim 1 in which the number of electronics equipment includes one of a flight control computer, a flight management computer, a thrust control computer, an electronic flight instrument, a flight warning computer, and a digital flight recorder.

18. A communication system for an aircraft comprising;
a plurality of first communication system devices located in a number of electronics equipment connected by a pair of wires and configured for unidirectional communication in a first frequency range and in a first direction on a first wire of the pair of wires and for unidirectional communication in a second direction on a second wire of the pair of wires; and a plurality of second communication system devices associated with the plurality of electronics equipment and configured for bi-directional communication in a second frequency range on each of the first wire and the second wire.

19. The communication system of claim 18 further comprising:
a transceiver in each of the second communication system devices configured to avoid the first frequency range and to identify a particular electronics equipment and a number of capabilities of the particular electronic equipment to which the transceiver is associated by a particular second communication system device in which the transceiver is located; and
a controller in each of the second communication system devices configured to direct the transceiver to select a particular portion of the second frequency range for sending or receiving a number of signals.

20. The communication system of claim 19 in which the transceiver is directed by the controller to employ one or more of a plurality of modulation schemes to divide the second frequency range into a plurality of sub-ranges, and in which the controller is further configured to direct the transceiver to select a sub-range from the plurality of sub-ranges for sending or receiving the number of signals.

21. The communication system of claim 18 in which each of the number of second communication system devices further comprises:
a first amplifier configured to amplify a signal in the second frequency range to a level required by a transceiver for receipt of the signal; and
a second amplifier configured to transmit a signal generated by the transceiver in the second frequency, the amplitude and second frequency being a noise region filtered by the plurality of first equipment and by the second equipment.

22. The communication system of claim 18 in which each of the plurality of second communication system devices is connected to a particular central processing unit of a particular electronics equipment of the plurality of equipment by a particular local bus of the particular electronics equipment and in which each of the number of second communication system devices is located in each of the number of electronics equipment without any change in a size of any of the number of electronics equipment and of a connectivity to the bus network of any of the number of electronics equipment.

23. The communication system of claim 18 further comprising:
a first amplifier connected to each of the number of second communication system devices and configured to amplify a signal in the second frequency range to a level required by the transceiver for receipt of the signal; and
a second amplifier configured to transmit a signal generated by the transceiver in the second frequency, the amplitude and second frequency being within a noise region masked from the plurality of first communication system devices in the plurality of electronics equipment and in the data acquisition unit.

24. A method of sending signals over a set of lines comprising:
connecting a number of electronics equipment to a bus having a set of lines;
associating a number of second communication system devices associated with the number of electronics equipment;
configuring each of the number of second communication system devices to send and to receive a plurality of signals on a line of the set of lines in a second frequency range masked from a number of first communication devices operating in a first frequency range on the bus and located in each of the number of electronics equipment; and
configuring each of the first communication devices for unidirectional communication in the first frequency range on each of the set of lines;
configuring each of the number of second communication system devices for bi-directional communication in a second frequency range on each of the set of lines.

25. The method of claim 24 further comprising:
configuring a transmitter in each of the number of electronics equipment for unidirectional transmission on one line of the set of lines in the first frequency range and in which the receiver is configured for unidirectional reception on another line of the set of lines in the first frequency range.

26. The method of claim 25 further comprising:
configuring a receiver in each of the number of electronics equipment for unidirectional reception on another line of the set of lines in the first frequency range;
configuring a transceiver in each of the second communication system devices to avoid the first frequency range and to identify a particular electronics equipment and a number of capabilities of the particular electronics equipment to which the transceiver is associated by a particular second communication system device in which the transceiver is located;
configuring a controller in each of the second communication system devices to direct the transceiver to select a particular portion of the second frequency range for sending or receiving a number of signals;
configuring the controller to direct the transceiver to employ one or more of a plurality of modulation schemes to divide the portion of the second frequency range into a plurality of sub-portions; and
configuring the controller to direct the transceiver to select a sub-portion from the plurality of sub-portions for sending or receiving the number of signals.

* * * * *